(12) United States Patent
Chen et al.

(10) Patent No.: US 9,166,849 B2
(45) Date of Patent: Oct. 20, 2015

(54) LARGE DELAY CYCLIC DELAY DIVERSITY (CDD) PRECODER FOR OPEN LOOP MULTIPLE-INPUT MULTIPLE-OUTPUT (MIMO)

(75) Inventors: Xiaogang Chen, Beijing (CN); Yuan Zhu, Beijing (CN); Qinghua Li, San Ramon, CA (US); Huaning Niu, Milpitas, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/994,114

(22) PCT Filed: Oct. 1, 2011

(86) PCT No.: PCT/US2011/054472
§ 371 (c)(1),
(2), (4) Date: Oct. 3, 2013

(87) PCT Pub. No.: WO2012/108913
PCT Pub. Date: Aug. 16, 2012

(65) Prior Publication Data
US 2014/0016714 A1 Jan. 16, 2014

Related U.S. Application Data

(60) Provisional application No. 61/439,987, filed on Feb. 7, 2011.

(51) Int. Cl.
*H04L 1/02* (2006.01)
*H04B 7/02* (2006.01)
(Continued)

(52) U.S. Cl.
CPC ............... *H04L 27/26* (2013.01); *H04B 7/024* (2013.01); *H04B 7/0456* (2013.01);
(Continued)

(58) Field of Classification Search
CPC ......... H04L 1/0618; H04L 1/06; H04L 27/26;
H04W 16/28; H04W 52/42; H04W 24/02;
H04W 72/042; H04B 7/0669; H04B 7/0456;
H04B 7/024; H04B 7/0619
USPC ............ 375/295, 299, 267; 370/334; 455/101
See application file for complete search history.

(56) References Cited

U.S. PATENT DOCUMENTS 8,379,738 B2 * 2/2013 Pi et al. .................. 375/260
8,488,537 B2 * 7/2013 Ko et al. ................. 370/329
(Continued)

FOREIGN PATENT DOCUMENTS

| CN | 101682453 A | 3/2010 |
|---|---|---|
| WO | WO 2009/113766 | 9/2009 |
| WO | 2012/108913 A1 | 8/2012 |

OTHER PUBLICATIONS

International Perliminary Report on Patentability received for PCT application No. PCT/US2011/054472, mailed on Aug. 22, 2013, 9 pages.

(Continued)

*Primary Examiner* — Ted Wang
(74) *Attorney, Agent, or Firm* — Thorpe North & Western LLP

(57) ABSTRACT

A physical channel processor on a wireless device and method for precoding for spatial multiplexing in an open-loop multiple-input multiple-output (MIMO) mobile communication system is disclosed. The method comprises the operation of receiving an input vector block from a layer mapper. The input vector block includes user equipment-specific reference signals (UE-RSs) or data in a physical downlink shared channel (PDSCH). The operation of generating a large delay cyclic delay diversity (CDD) vector block from the input vector block using a precoder configured for large delay CDD on an antenna port follows. The data can be resource element mapped with UE-RSs or channel-state information reference signals (CSI-RSs) in a physical resource block (PRB).

25 Claims, 18 Drawing Sheets

(51) Int. Cl.
| | |
|---|---|
| *H04L 27/26* | (2006.01) |
| *H04B 7/04* | (2006.01) |
| *H04B 7/06* | (2006.01) |
| *H04L 1/06* | (2006.01) |
| *H04W 56/00* | (2009.01) |
| *H04W 72/04* | (2009.01) |
| *H04W 24/02* | (2009.01) |

(52) U.S. Cl.
CPC ............... *H04B 7/0619* (2013.01); *H04L 1/06* (2013.01); *H04W 24/02* (2013.01); *H04W 56/0045* (2013.01); *H04W 56/0085* (2013.01); *H04W 72/042* (2013.01)

(56) References Cited

U.S. PATENT DOCUMENTS

| | | | |
|---|---|---|---|
| 8,676,133 B2 * | 3/2014 | Montojo et al. ................. | 455/82 |
| 2008/0192849 A1 | 8/2008 | Kim et al. | |
| 2009/0110114 A1 | 4/2009 | Onggosanusi et al. | |
| 2010/0034312 A1 | 2/2010 | Muharemovic et al. | |
| 2011/0013615 A1 | 1/2011 | Lee et al. | |
| 2011/0111781 A1 * | 5/2011 | Chen et al. ..................... | 455/507 |
| 2011/0194551 A1 * | 8/2011 | Lee et al. ....................... | 370/342 |

OTHER PUBLICATIONS

International Search Report and Written Opinion received for PCT application No. PCT/US2011/054472, mailed on May 4, 2012, 9 Pages.

3GPP; 3$^{rd}$ Generation Partnership Project; Technical Specification Group Radio Access Network; Evolved Universal Terrestrial Radio Access (E-UTRA); Physical channels and modulation; 3GPP TS 36.211 v10.0.0; Dec. 2010; 103 pages; Release 10.

3GPP; 3$^{rd}$ Generation Partnership Project; Technical Specification Group Radio Access Network; Evolved Universal Terrestrial Radio Access (E-UTRA); Physical layer procedures; 3GPP TS 36.213 v10.0.1; Dec. 2010; 98 pages; Release 10.

Ericsson; Introduction of Rel-10 LTE-Advanced features in 36.211; 3GPP TSG-RAN Meeting #63; R1-106555; Nov. 15 — 19, 2010; 101 pages; Change Request; Jacksonville, Florida, USA.

Motorola; Introduction of Rel-10 LTE-Advanced features in 36.213; 3GPP TSG-RAN Meeting #63; R1-106557; Nov. 15 — 19, 2010; 96 pages; Change Request; Jacksonville, Florida, USA.

Qualcomm Inc.; Introduction of Rel-10 LTE-Advance features in 36.212; 3GPP TSG-RAN Meeting #63; R1-106556; Nov. 15 — 19, 2010; 72 pages; Change Request; Jacksonville, Florida, USA.

* cited by examiner

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 2B | UE specific by C-RNTI | Dual layer transmission, port 7 and 8 (see subclause 7.1.5A) or single-antenna port, port 7 or 8 (see subclause 7.1.1) |
| Mode 9 | DCI format 1A | Common and UE specific by C-RNTI | Non-MBSFN subframe: If the number of PBCH antenna ports is one, Single-antenna port, port 0 is used (see subclause 7.1.1), otherwise Transmit diversity (see subclause 7.1.2) Signaled MBSFN subframe with unicast allocation: Single-antenna port, port 7 (see subclause 7.1.1) |
| | DCI format 2C | UE specific by C-RNTI | Up to 8 layer transmission, ports 7-14 (see subclause 7.1.5B) |
| Mode 10 | DCI format 1A | Common and UE specific by C-RNTI | Transmit diversity (see subclause 7.1.2) |
| | DCI format 2D | UE specific by C-RNTI | Large delay CDD (see subclause 7.1.3) or Transmit diversity (see subclause 7.1.2) |

FIG. 6

| Number of antenna ports at eNodeB | Number of bits for precoding information |
|---|---|
| 2 | 0 |
| 4 | 2 |
| 8 | 3 |

FIG. 7

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 2/4 layers: Transmit diversity, depends on number of CRS ports | 0 | 2 layers: precoder cycling with large delay CDD |
| 1 | 2 layers: precoder cycling with large delay CDD | 1 | 3 layers: precoder cycling with large delay CDD |
| 2 | 3 layers: precoder cycling with large delay CDD | 2 | 4 layers: precoder cycling with large delay CDD |
| 3 | 4 layers: precoder cycling with large delay CDD | 3 | 5 layers: precoder cycling with large delay CDD |
| 4 | reserved | 4 | 6 layers: precoder cycling with large delay CDD |
| 5 | reserved | 5 | 7 layers: precoder cycling with large delay CDD |
| 6 | reserved | 6 | 8 layers: precoder cycling with large delay CDD |
| 7 | reserved | 7 | Reserved |

FIG. 8

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{(1)}$ | $W_0^{(14)}/\sqrt{2}$ | $W_0^{(124)}/\sqrt{3}$ | $W_0^{(1234)}/2$ |
| 1 | $u_1 = [1\ -j\ 1\ j]^T$ | $W_1^{(1)}$ | $W_1^{(12)}/\sqrt{2}$ | $W_1^{(123)}/\sqrt{3}$ | $W_1^{(1234)}/2$ |
| 2 | $u_2 = [1\ 1\ -1\ 1]^T$ | $W_2^{(1)}$ | $W_2^{(12)}/\sqrt{2}$ | $W_2^{(123)}/\sqrt{3}$ | $W_2^{(3214)}/2$ |
| 3 | $u_3 = [1\ j\ 1\ -j]^T$ | $W_3^{(1)}$ | $W_3^{(12)}/\sqrt{2}$ | $W_3^{(123)}/\sqrt{3}$ | $W_3^{(3214)}/2$ |
| 4 | $u_4 = [1\ (-1-j)/\sqrt{2}\ -j\ (1-j)/\sqrt{2}]^T$ | $W_4^{(1)}$ | $W_4^{(14)}/\sqrt{2}$ | $W_4^{(124)}/\sqrt{3}$ | $W_4^{(1234)}/2$ |
| 5 | $u_5 = [1\ (1-j)/\sqrt{2}\ j\ (-1-j)/\sqrt{2}]^T$ | $W_5^{(1)}$ | $W_5^{(14)}/\sqrt{2}$ | $W_5^{(124)}/\sqrt{3}$ | $W_5^{(1234)}/2$ |
| 6 | $u_6 = [1\ (1+j)/\sqrt{2}\ -j\ (-1+j)/\sqrt{2}]^T$ | $W_6^{(1)}$ | $W_6^{(13)}/\sqrt{2}$ | $W_6^{(134)}/\sqrt{3}$ | $W_6^{(1324)}/2$ |
| 7 | $u_7 = [1\ (-1+j)/\sqrt{2}\ j\ (1+j)/\sqrt{2}]^T$ | $W_7^{(1)}$ | $W_7^{(13)}/\sqrt{2}$ | $W_7^{(134)}/\sqrt{3}$ | $W_7^{(1324)}/2$ |
| 8 | $u_8 = [1\ -1\ 1\ 1]^T$ | $W_8^{(1)}$ | $W_8^{(12)}/\sqrt{2}$ | $W_8^{(124)}/\sqrt{3}$ | $W_8^{(1234)}/2$ |
| 9 | $u_9 = [1\ -j\ -1\ -j]^T$ | $W_9^{(1)}$ | $W_9^{(14)}/\sqrt{2}$ | $W_9^{(134)}/\sqrt{3}$ | $W_9^{(1234)}/2$ |
| 10 | $u_{10} = [1\ 1\ 1\ -1]^T$ | $W_{10}^{(1)}$ | $W_{10}^{(13)}/\sqrt{2}$ | $W_{10}^{(123)}/\sqrt{3}$ | $W_{10}^{(1324)}/2$ |
| 11 | $u_{11} = [1\ j\ -1\ j]^T$ | $W_{11}^{(1)}$ | $W_{11}^{(13)}/\sqrt{2}$ | $W_{11}^{(134)}/\sqrt{3}$ | $W_{11}^{(1324)}/2$ |
| 12 | $u_{12} = [1\ -1\ -1\ 1]^T$ | $W_{12}^{(1)}$ | $W_{12}^{(12)}/\sqrt{2}$ | $W_{12}^{(123)}/\sqrt{3}$ | $W_{12}^{(1234)}/2$ |
| 13 | $u_{13} = [1\ -1\ 1\ -1]^T$ | $W_{13}^{(1)}$ | $W_{13}^{(13)}/\sqrt{2}$ | $W_{13}^{(123)}/\sqrt{3}$ | $W_{13}^{(1324)}/2$ |
| 14 | $u_{14} = [1\ 1\ -1\ -1]^T$ | $W_{14}^{(1)}$ | $W_{14}^{(13)}/\sqrt{2}$ | $W_{14}^{(123)}/\sqrt{3}$ | $W_{14}^{(3214)}/2$ |
| 15 | $u_{15} = [1\ 1\ 1\ 1]^T$ | $W_{15}^{(1)}$ | $W_{15}^{(12)}/\sqrt{2}$ | $W_{15}^{(123)}/\sqrt{3}$ | $W_{15}^{(1234)}/2$ |

FIG. 9A

| $i_1$ | $i_2$ | | | |
|---|---|---|---|---|
| | 0 | 1 | 2 | 3 |
| 0 – 15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |
| $i_1$ | $i_2$ | | | |
| | 4 | 5 | 6 | 7 |
| 0 – 15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| $i_1$ | $i_2$ | | | |
| | 8 | 9 | 10 | 11 |
| 0 – 15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |
| $i_1$ | $i_2$ | | | |
| | 12 | 13 | 14 | 15 |
| 0 – 15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \dfrac{1}{4}\begin{bmatrix} v_m & v_{m'} \\ \varphi_n v_m & -\varphi_n v_{m'} \end{bmatrix}$

FIG. 9B

| $i_1$ | $i_2$ | | | |
|---|---|---|---|---|
| | 0 | 1 | 2 | 3 |
| 0 - 3 | $W^{(3)}_{8i_1,8i_1,8i_1+8}$ | $W^{(3)}_{8i_1+8,8i_1,8i_1+8}$ | $\widetilde{W}^{(3)}_{8i_1,8i_1+8,8i_1+8}$ | $\widetilde{W}^{(3)}_{8i_1+8,8i_1,8i_1}$ |
| $i_1$ | $i_2$ | | | |
| | 4 | 5 | 6 | 7 |
| 0 - 3 | $W^{(3)}_{8i_1+2,8i_1+2,8i_1+10}$ | $W^{(3)}_{8i_1+10,8i_1+2,8i_1+10}$ | $\widetilde{W}^{(3)}_{8i_1+2,8i_1+10,8i_1+10}$ | $\widetilde{W}^{(3)}_{8i_1+10,8i_1+2,8i_1+2}$ |
| $i_1$ | $i_2$ | | | |
| | 8 | 9 | 10 | 11 |
| 0 - 3 | $W^{(3)}_{8i_1+4,8i_1+4,8i_1+12}$ | $W^{(3)}_{8i_1+12,8i_1+4,8i_1+12}$ | $\widetilde{W}^{(3)}_{8i_1+4,8i_1+12,8i_1+12}$ | $\widetilde{W}^{(3)}_{8i_1+12,8i_1+4,8i_1+4}$ |
| $i_1$ | $i_2$ | | | |
| | 12 | 13 | 14 | 15 |
| 0 - 3 | $W^{(3)}_{8i_1+6,8i_1+6,8i_1+14}$ | $W^{(3)}_{8i_1+14,8i_1+6,8i_1+14}$ | $\widetilde{W}^{(3)}_{8i_1+6,8i_1+14,8i_1+14}$ | $\widetilde{W}^{(3)}_{8i_1+14,8i_1+6,8i_1+6}$ | where $W^{(3)}_{m,m',m''} = \frac{1}{\sqrt{24}}\begin{bmatrix} v_m & v_{m'} & v_{m''} \\ v_m & -v_{m'} & -v_{m''} \end{bmatrix}$, $\widetilde{W}^{(3)}_{m,m',m''} = \frac{1}{\sqrt{24}}\begin{bmatrix} v_m & v_{m'} & v_{m''} \\ v_m & v_{m'} & -v_{m''} \end{bmatrix}$

FIG. 9C

| $i_1$ | $i_2$ | | | |
|---|---|---|---|---|
| | 0 | 1 | 2 | 3 |
| 0 - 3 | $W^{(4)}_{8i_1,8i_1+8,0}$ | $W^{(4)}_{8i_1,8i_1+8,1}$ | $W^{(4)}_{8i_1+2,8i_1+10,0}$ | $W^{(4)}_{8i_1+2,8i_1+10,1}$ |
| $i_1$ | $i_2$ | | | |
| | 4 | 5 | 6 | 7 |
| 0 - 3 | $W^{(4)}_{8i_1+4,8i_1+12,0}$ | $W^{(4)}_{8i_1+4,8i_1+12,1}$ | $W^{(4)}_{8i_1+6,8i_1+14,0}$ | $W^{(4)}_{8i_1+6,8i_1+14,1}$ | where $W^{(4)}_{m,m',n} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

FIG. 9D

| $i_1$ | $i_2$ |
|---|---|
| | 0 |
| 0 - 3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

FIG. 9E

| $i_1$ | $i_2$ |
|---|---|
| | 0 |
| 0 - 3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

FIG. 9F

| $i_1$ | $i_2$ |
|---|---|
| | 0 |
| 0 - 3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

FIG. 9G

| $i_1$ | $i_2$ |
|---|---|
| | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

FIG. 9H

| Codebook index | Number of layers $\upsilon$ | |
|---|---|---|
| | 1 | 2 |
| 0 | $\frac{1}{\sqrt{2}} \begin{bmatrix} 1 \\ 1 \end{bmatrix}$ | $\frac{1}{\sqrt{2}} \begin{bmatrix} 1 & 0 \\ 0 & 1 \end{bmatrix}$ |
| 1 | $\frac{1}{\sqrt{2}} \begin{bmatrix} 1 \\ -1 \end{bmatrix}$ | $\frac{1}{2} \begin{bmatrix} 1 & 1 \\ 1 & -1 \end{bmatrix}$ |
| 2 | $\frac{1}{\sqrt{2}} \begin{bmatrix} 1 \\ j \end{bmatrix}$ | $\frac{1}{2} \begin{bmatrix} 1 & 1 \\ j & -j \end{bmatrix}$ |
| 3 | $\frac{1}{\sqrt{2}} \begin{bmatrix} 1 \\ -j \end{bmatrix}$ | - |

FIG. 9I

| Number of layers $v$ | $U$ | $D(f)$ |
|---|---|---|
| 2 | $\dfrac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi/2} \end{bmatrix}$ |
| 3 | $\dfrac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi/3} & 0 \\ 0 & 0 & e^{-j4\pi/3} \end{bmatrix}$ |
| 4 | $\dfrac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi/4} & 0 & 0 \\ 0 & 0 & e^{-j4\pi/4} & 0 \\ 0 & 0 & 0 & e^{-j6\pi/4} \end{bmatrix}$ |
| 5 | $\dfrac{1}{\sqrt{5}}\begin{bmatrix} 1 & 1 & 1 & 1 & 1 \\ 1 & e^{-j2\pi/5} & e^{-j4\pi/5} & e^{-j6\pi/5} & e^{-j8\pi/5} \\ 1 & e^{-j4\pi/5} & e^{-j8\pi/5} & e^{-j12\pi/5} & e^{-j16\pi/5} \\ 1 & e^{-j6\pi/5} & e^{-j12\pi/5} & e^{-j18\pi/5} & e^{-j24\pi/5} \\ 1 & e^{-j8\pi/5} & e^{-j16\pi/5} & e^{-j24\pi/5} & e^{-j32\pi/5} \end{bmatrix}$ | $\begin{bmatrix} 1 & 0 & 0 & 0 & 0 \\ 0 & e^{-j2\pi/5} & 0 & 0 & 0 \\ 0 & 0 & e^{-j4\pi/5} & 0 & 0 \\ 0 & 0 & 0 & e^{-j6\pi/5} & 0 \\ 0 & 0 & 0 & 0 & e^{-j8\pi/5} \end{bmatrix}$ |
| 6 | $\dfrac{1}{\sqrt{6}}\begin{bmatrix} 1 & 1 & 1 & 1 & 1 & 1 \\ 1 & e^{-j2\pi/6} & e^{-j4\pi/6} & e^{-j6\pi/6} & e^{-j8\pi/6} & e^{-j10\pi/6} \\ 1 & e^{-j4\pi/6} & e^{-j8\pi/6} & e^{-j12\pi/6} & e^{-j16\pi/6} & e^{-j20\pi/6} \\ 1 & e^{-j6\pi/6} & e^{-j12\pi/6} & e^{-j18\pi/6} & e^{-j24\pi/6} & e^{-j30\pi/6} \\ 1 & e^{-j8\pi/6} & e^{-j16\pi/6} & e^{-j24\pi/6} & e^{-j32\pi/6} & e^{-j40\pi/6} \\ 1 & e^{-j10\pi/6} & e^{-j20\pi/6} & e^{-j30\pi/6} & e^{-j40\pi/6} & e^{-j50\pi/6} \end{bmatrix}$ | $\begin{bmatrix} 1 & 0 & 0 & 0 & 0 & 0 \\ 0 & e^{-j2\pi/6} & 0 & 0 & 0 & 0 \\ 0 & 0 & e^{-j4\pi/6} & 0 & 0 & 0 \\ 0 & 0 & 0 & e^{-j6\pi/6} & 0 & 0 \\ 0 & 0 & 0 & 0 & e^{-j8\pi/6} & 0 \\ 0 & 0 & 0 & 0 & 0 & e^{-j10\pi/6} \end{bmatrix}$ |
| 7 | $\dfrac{1}{\sqrt{7}}\begin{bmatrix} 1 & 1 & 1 & 1 & 1 & 1 & 1 \\ 1 & e^{-j2\pi/7} & e^{-j4\pi/7} & e^{-j6\pi/7} & e^{-j8\pi/7} & e^{-j10\pi/7} & e^{-j12\pi/7} \\ 1 & e^{-j4\pi/7} & e^{-j8\pi/7} & e^{-j12\pi/7} & e^{-j16\pi/7} & e^{-j20\pi/7} & e^{-j24\pi/7} \\ 1 & e^{-j6\pi/7} & e^{-j12\pi/7} & e^{-j18\pi/7} & e^{-j24\pi/7} & e^{-j30\pi/7} & e^{-j36\pi/7} \\ 1 & e^{-j8\pi/7} & e^{-j16\pi/7} & e^{-j24\pi/7} & e^{-j32\pi/7} & e^{-j40\pi/7} & e^{-j48\pi/7} \\ 1 & e^{-j10\pi/7} & e^{-j20\pi/7} & e^{-j30\pi/7} & e^{-j40\pi/7} & e^{-j50\pi/7} & e^{-j60\pi/7} \\ 1 & e^{-j12\pi/7} & e^{-j24\pi/7} & e^{-j36\pi/7} & e^{-j48\pi/7} & e^{-j60\pi/7} & e^{-j72\pi/7} \end{bmatrix}$ | $\begin{bmatrix} 1 & 0 & 0 & 0 & 0 & 0 & 0 \\ 0 & e^{-j2\pi/7} & 0 & 0 & 0 & 0 & 0 \\ 0 & 0 & e^{-j4\pi/7} & 0 & 0 & 0 & 0 \\ 0 & 0 & 0 & e^{-j6\pi/7} & 0 & 0 & 0 \\ 0 & 0 & 0 & 0 & e^{-j8\pi/7} & 0 & 0 \\ 0 & 0 & 0 & 0 & 0 & e^{-j10\pi/7} & 0 \\ 0 & 0 & 0 & 0 & 0 & 0 & e^{-j12\pi/7} \end{bmatrix}$ |
| 8 | $\dfrac{1}{\sqrt{8}}\begin{bmatrix} 1 & 1 & 1 & 1 & 1 & 1 & 1 & 1 \\ 1 & e^{-j2\pi/8} & e^{-j4\pi/8} & e^{-j6\pi/8} & e^{-j8\pi/8} & e^{-j10\pi/8} & e^{-j12\pi/8} & e^{-j14\pi/8} \\ 1 & e^{-j4\pi/8} & e^{-j8\pi/8} & e^{-j12\pi/8} & e^{-j16\pi/8} & e^{-j20\pi/8} & e^{-j24\pi/8} & e^{-j28\pi/8} \\ 1 & e^{-j6\pi/8} & e^{-j12\pi/8} & e^{-j18\pi/8} & e^{-j24\pi/8} & e^{-j30\pi/8} & e^{-j36\pi/8} & e^{-j42\pi/8} \\ 1 & e^{-j8\pi/8} & e^{-j16\pi/8} & e^{-j24\pi/8} & e^{-j32\pi/8} & e^{-j40\pi/8} & e^{-j48\pi/8} & e^{-j56\pi/8} \\ 1 & e^{-j10\pi/8} & e^{-j20\pi/8} & e^{-j30\pi/8} & e^{-j40\pi/8} & e^{-j50\pi/8} & e^{-j60\pi/8} & e^{-j70\pi/8} \\ 1 & e^{-j12\pi/8} & e^{-j24\pi/8} & e^{-j36\pi/8} & e^{-j48\pi/8} & e^{-j60\pi/8} & e^{-j72\pi/8} & e^{-j84\pi/8} \\ 1 & e^{-j14\pi/8} & e^{-j28\pi/8} & e^{-j42\pi/8} & e^{-j56\pi/8} & e^{-j70\pi/8} & e^{-j84\pi/8} & e^{-j98\pi/8} \end{bmatrix}$ | $\begin{bmatrix} 1 & 0 & 0 & 0 & 0 & 0 & 0 & 0 \\ 0 & e^{-j2\pi/8} & 0 & 0 & 0 & 0 & 0 & 0 \\ 0 & 0 & e^{-j4\pi/8} & 0 & 0 & 0 & 0 & 0 \\ 0 & 0 & 0 & e^{-j6\pi/8} & 0 & 0 & 0 & 0 \\ 0 & 0 & 0 & 0 & e^{-j8\pi/8} & 0 & 0 & 0 \\ 0 & 0 & 0 & 0 & 0 & e^{-j10\pi/8} & 0 & 0 \\ 0 & 0 & 0 & 0 & 0 & 0 & e^{-j12\pi/8} & 0 \\ 0 & 0 & 0 & 0 & 0 & 0 & 0 & e^{-j14\pi/8} \end{bmatrix}$ |

FIG. 10

LARGE DELAY CYCLIC DELAY DIVERSITY (CDD) PRECODER FOR OPEN LOOP MULTIPLE-INPUT MULTIPLE-OUTPUT (MIMO)

RELATED APPLICATIONS

This application claims the benefit of and hereby incorporates by reference U.S. Provisional Patent Application Ser. No. 61/439,987, filed Feb. 7, 2011.

BACKGROUND

Wireless mobile communication technology uses various standards and protocols to transmit data between a base transceiver station (BTS) and a wireless mobile device. Some wireless devices communicate using an orthogonal frequency-division multiplexing (OFDM) digital modulation scheme via a physical layer. OFDM standards and protocols can include the third generation partnership project (3GPP) long term evolution (LTE), the Institute of Electrical and Electronics Engineers (IEEE) 802.16 standard (e.g., 802.16e, 802.16m), which is commonly known to industry groups as WiMax (Worldwide interoperability for Microwave Access), and the IEEE 802.11 standard, which is commonly known to industry groups as WiFi. In 3GPP radio access networks (RANs) LTE systems, the BTS can be a combination of evolved Node Bs (also commonly denoted as enhanced Node Bs, eNodeBs, or eNBs) and Radio Network Controllers (RNCs) in a Universal Terrestrial Radio Access Network (UTRAN), which communicates with the wireless mobile device, known as a user equipment (UE). Both the BTS and wireless mobile device can transmit and receive data. The transmitting station (Transmitter or Tx) can transmit data via a signal on a channel to a receiving station (Receiver or Rx), where a channel uses a specified frequency bandwidth. Transmission modes can be used to allow different types of transmissions between a BTS and wireless mobile device.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6 illustrates a table of transmission modes for a physical downlink control channel (PDCCH) and physical downlink shared channel (PDSCH) configured by cell radio network temporary identifier (C-RNTI) in accordance with an example;

FIG. 7 illustrates a table of a number of bits for precoding information in accordance with an example;

FIG. 8 illustrates a table of contents of precoding information field for eight antenna ports in accordance with an example;

FIG. 9A illustrates a table of codebook for transmission on four antenna ports in accordance with an example;

FIG. 9B illustrates a table of codebook for 2-layer channel state information (CSI) reporting using antenna ports 15 to 22 in accordance with an example;

FIG. 9C illustrates a table of codebook for 3-layer channel state information (CSI) reporting using antenna ports 15 to 22 in accordance with an example;

FIG. 9D illustrates a table of codebook for 4-layer channel state information (CSI) reporting using antenna ports 15 to 22 in accordance with an example;

FIG. 9E illustrates a table of codebook for 5-layer channel state information (CSI) reporting using antenna ports 15 to 22 in accordance with an example;

FIG. 9F illustrates a table of codebook for 6-layer channel state information (CSI) using antenna ports 15 to 22 in accordance with an example;

FIG. 9G illustrates a table of codebook for 7-layer channel state information (CSI) reporting using antenna ports 15 to 22 in accordance with an example;

FIG. 9H illustrates a table of codebook for 8-layer channel state information (CSI) reporting using antenna ports 15 to 22 in accordance with an example;

FIG. 9I illustrates a table of codebook for transmission on two antenna ports in accordance with an example;

FIG. 10 illustrates a table of a rotation matrix U and a diagonal large delay cyclic delay diversity (CDD) matrix D(i) used in large-delay cyclic delay diversity (CDD) for two to eight layers in accordance with an example;

Figure 1:
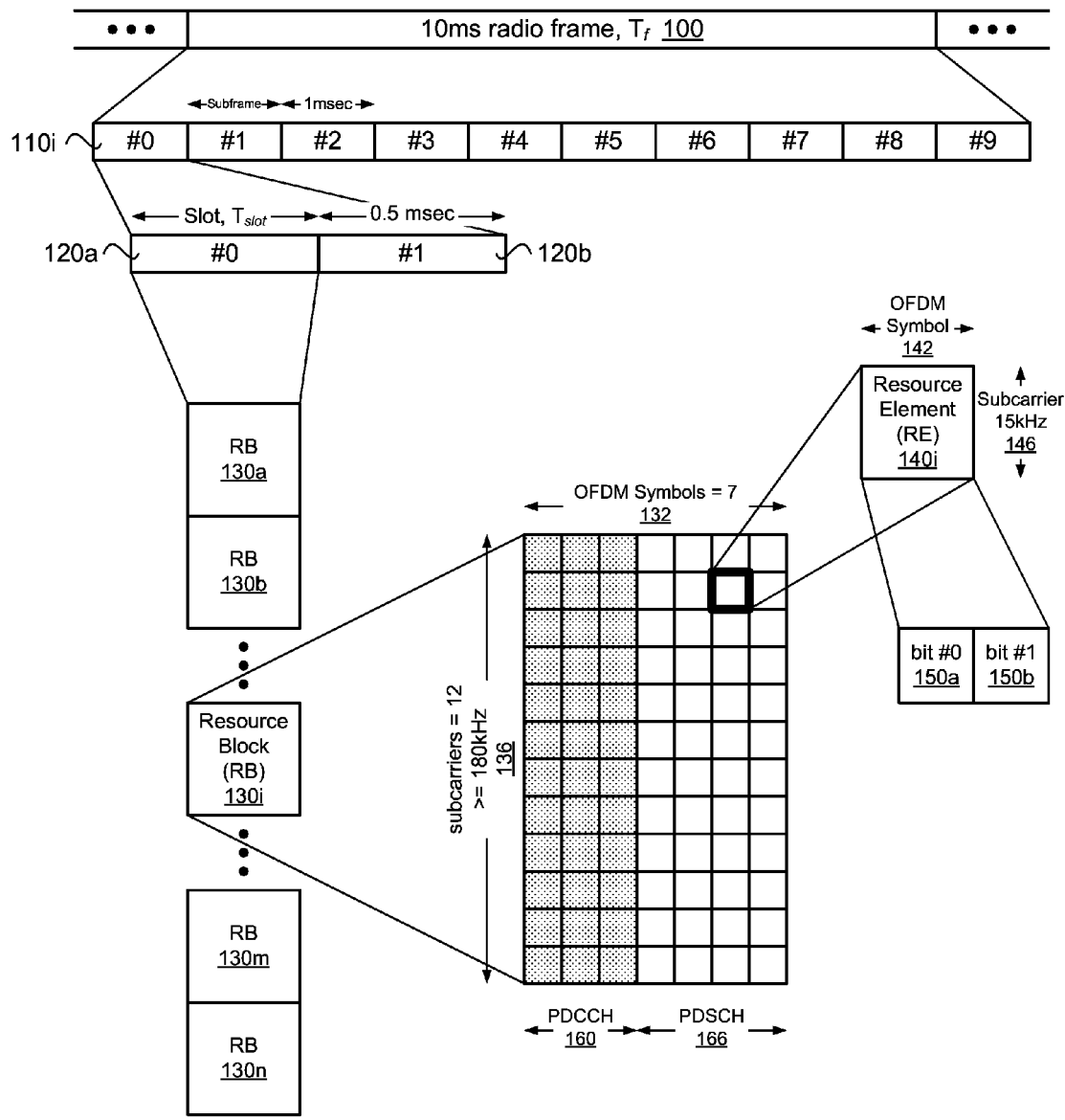
FIG. 1 illustrates a block diagram of radio frame resources in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

A precoder (and an associated transmission mode) for large delay (LD) cyclic delay diversity (CDD) can be configured for UE-specific reference signal (UE-specific RS or UE-RS) or a demodulation reference signal (DMRS), and data in a physical downlink shared channel (PDSCH). The precoder can generate a large delay cyclic delay diversity (CDD) vector block from an input vector block where the input vector block includes user equipment-specific reference signals (UE-RSs) or data in a physical downlink shared channel (PDSCH). Data can be mapped to a physical resource block (PRB) with UE-RSs or channel-state information reference signal (CSI-RSs) using an element resource mapper.

In one example, data in wireless mobile communications can be transmitted on the physical (PHY) layer by the transmitting station (Transmitter or Tx) to the receiving station (Receiver or Rx) using a generic long term evolution (LTE) frame structure, as illustrated in FIG. 1. While an LTE frame structure is illustrated, a frame structure for an IEEE 802.16 standard (WiMax), an IEEE 802.11 standard (WiFi), or another type of communication standard using OFDM may also be used.

In the example illustrated in FIG. 1, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into two slots 120a and 120b, each with a duration, $T_{slot}$, of 0.5 ms. The first slot (#0) 120a can include a physical downlink control channel (PDCCH) 160 and/or a physical downlink shared channel (PDSCH) 166, and the second slot (#1) 120b can include data using the PDSCH. Each slot for a component carrier (CC) used by the transmitting station and the receiving station can include multiple resource blocks (RBs) 130a, 130b, 130i, 130m, and 130n based on the CC frequency bandwidth. Each RB (physical RB or PRB) 130i can include 12-15 kHz subcarriers 136 (on the frequency axis) and 6 or 7 orthogonal frequency-division multiplexing (OFDM) symbols 132 (on the time axis) per subcarrier. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Reference signals can be transmitted by OFDM symbols via resource elements in the resource blocks. Reference signals (or pilot signals or tones) can be a known signal used for various reasons, such as to estimate a channel and/or noise in the channel. Reference signals can be received and transmitted by transmitting stations and mobile communication devices. Different types of reference signals (RS) can be used in an RB. For example, in LTE systems, downlink reference signal types can include a cell-specific reference signal (CRS), a multicast\broadcast single-frequency network (MB-SFN) reference signal, a LTE-specific reference signal (UE-specific RS or UE-RS) or a demodulation reference signal (DMRS), positioning reference signal (PRS), and a channel-state information reference signal (CSI-RS).

In LTE systems, the CRS can be transmitted on antenna ports 0 to 3 for transceivers with up to four antenna ports and can be transmitted in downlink subframes in a cell supporting a physical downlink shared channel (PDSCH). Data can be transmitted from an eNodeB to a UE via a PDSCH. A physical downlink control channel (PDCCH) can be used to transfer downlink control information (DCI) that informs the UE about resource allocations or scheduling related to downlink resource assignments on the PDSCH, uplink resource grants, and uplink power control commands. The PDCCH can be transmitted prior to the PDSCH in each subframe transmitted from the eNodeB to the UE.

Figure 2A:
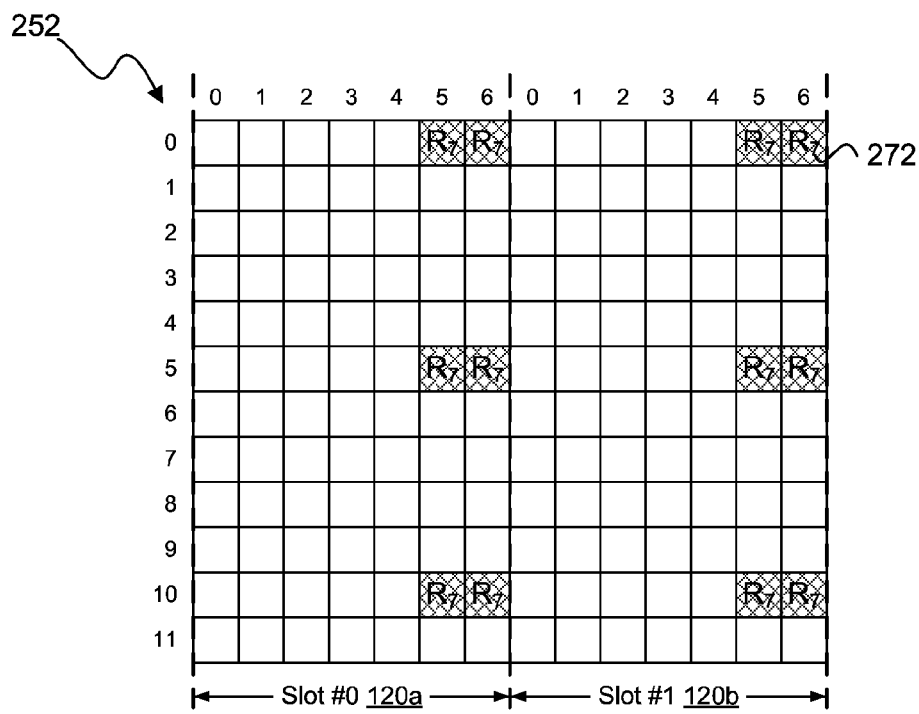
FIG. 2A illustrates a block diagram of user equipment-specific reference signals (UE-RSs) in a resource block (RB) in a normal downlink subframe (non-special subframe configuration 1, 2, 3, 4, 6, 7, or 8) for antenna port 7 in a two or four antenna port wireless transceiver in accordance with an example.
Figure 2B:
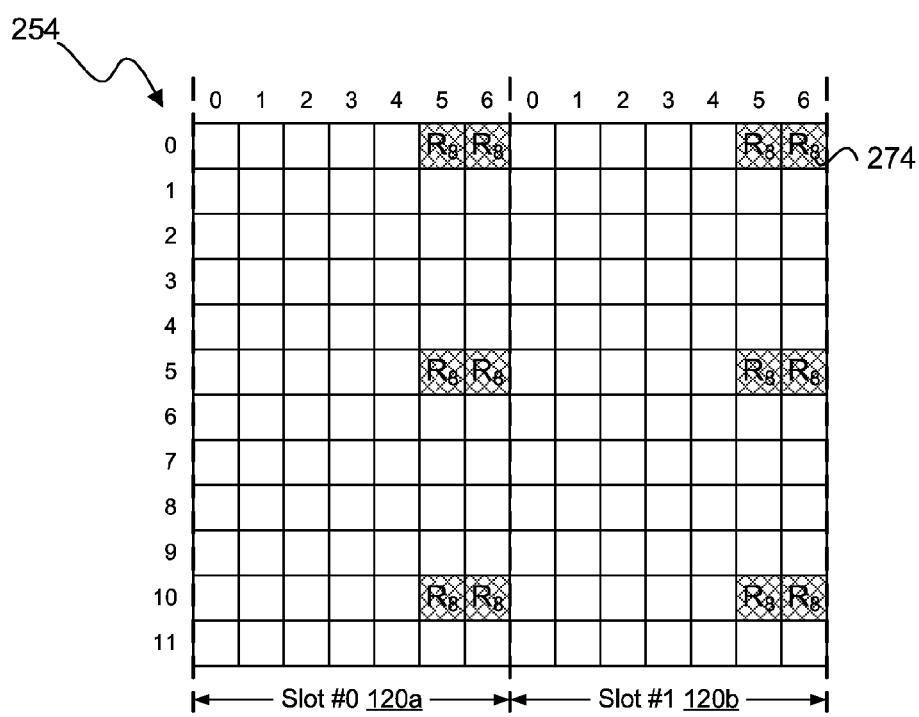
FIG. 2B illustrates a block diagram of user equipment-specific reference signals (UE-RSs) in a resource block (RB) in a normal downlink subframe (non-special subframe configuration 1, 2, 3, 4, 6, 7, or 8) for antenna port 8 in a two or four antenna port wireless transceiver in accordance with an example.

FIG. 2A illustrates an RB 252 with UE-RS for antenna port 7 in a two, four, or eight antenna port wireless transceiver. As illustrated in FIG. 2A, the RB may include twelve (12) UE-RS REs (UE-RS OFDM symbols) 272 in a normal downlink subframe (non-special subframe configuration 1, 2, 3, 4, 6, 7, or 8) used for transmitting UE-RSs for a specific antenna port (e.g., antenna port 7). FIG. 2B illustrates the LTE-RS REs 274 in an RB 254 used for transmitting UE-RSs for antenna port 8, which can be located in the REs with the same frequency-domain index and time-domain index as the UE-RS REs for antenna port 7.

Figure 2C:
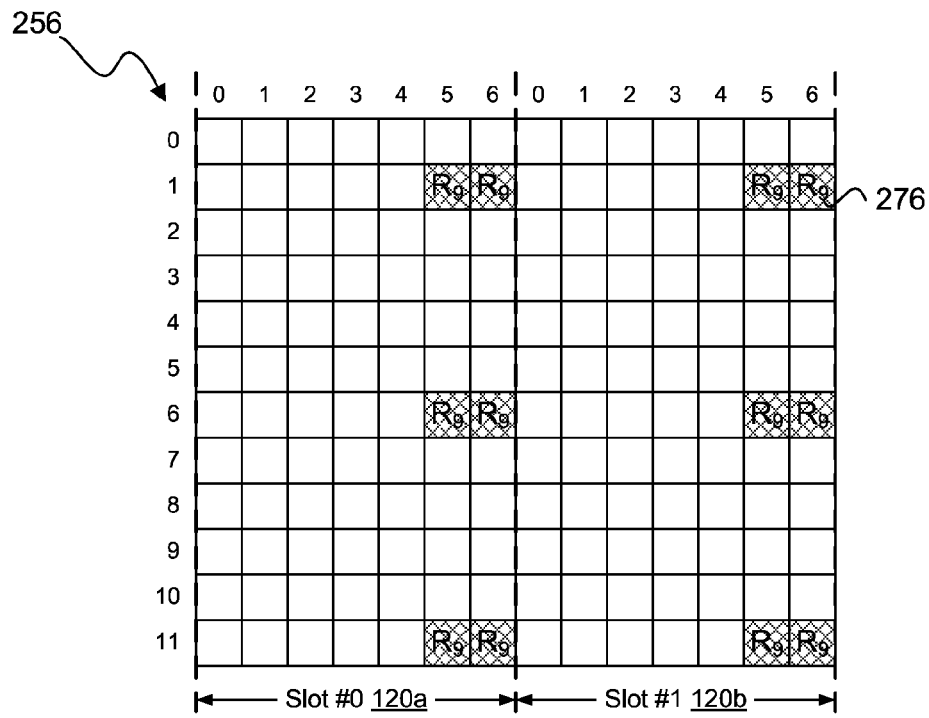
FIG. 2C illustrates a block diagram of user equipment-specific reference signals (UE-RSs) in a resource block (RB) in a normal downlink subframe (non-special subframe configuration 1, 2, 3, 4, 6, 7, or 8) for antenna port 9 in a four antenna port wireless transceiver in accordance with an example.
Figure 2D:
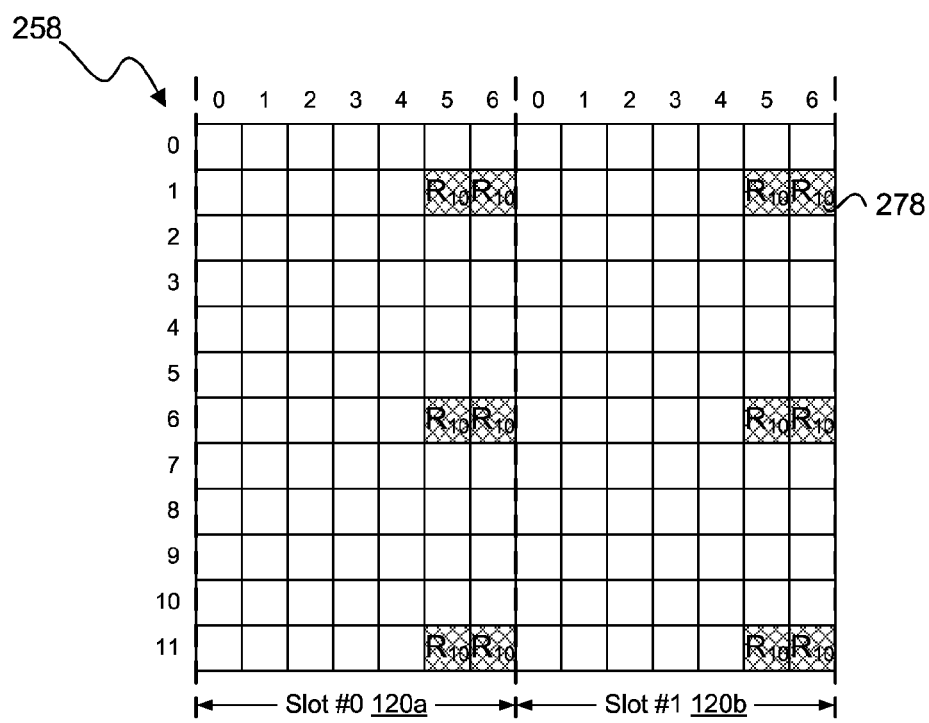
FIG. 2D illustrates a block diagram of user equipment-specific reference signals (UE-RSs) in a resource block (RB) in a normal downlink subframe (non-special subframe configuration 1, 2, 3, 4, 6, 7, or 8) for antenna port 10 in a four antenna port wireless transceiver in accordance with an example.

FIG. 2C illustrates the UE-RS REs 276 in an RB 256 used for transmitting UE-RSs for antenna port 9. FIG. 2D illustrates the UE-RS REs 278 in an RB 258 used for transmitting the UE-RSs for antenna port 10, which can be located in the REs with the same frequency-domain index and time-domain index as the LTE-RS REs for antenna port 9. An RB for the remaining antenna ports in an eight antenna port wireless transceiver may similarly configure the UE-RS in the REs. Data in the PDSCH can occupy the remaining REs. UE-RS special subframe configurations (not shown) may also be used.

In LTE systems, the UE-specific reference signal (UE-RS) or a demodulation reference signal (DMRS) can be transmitted on antenna ports 5 and 7 to 14 and can be transmitted in downlink subframes supporting a PDSCH. The UE-RS (DMRS) can be transmitted within the resource blocks assigned for downlink shared channel (DL-SCH) transmission to a specific terminal (mobile communication device), used for beamforming to a single UE using multiple antennas, and used for PDSCH demodulation.

Figure 3A:
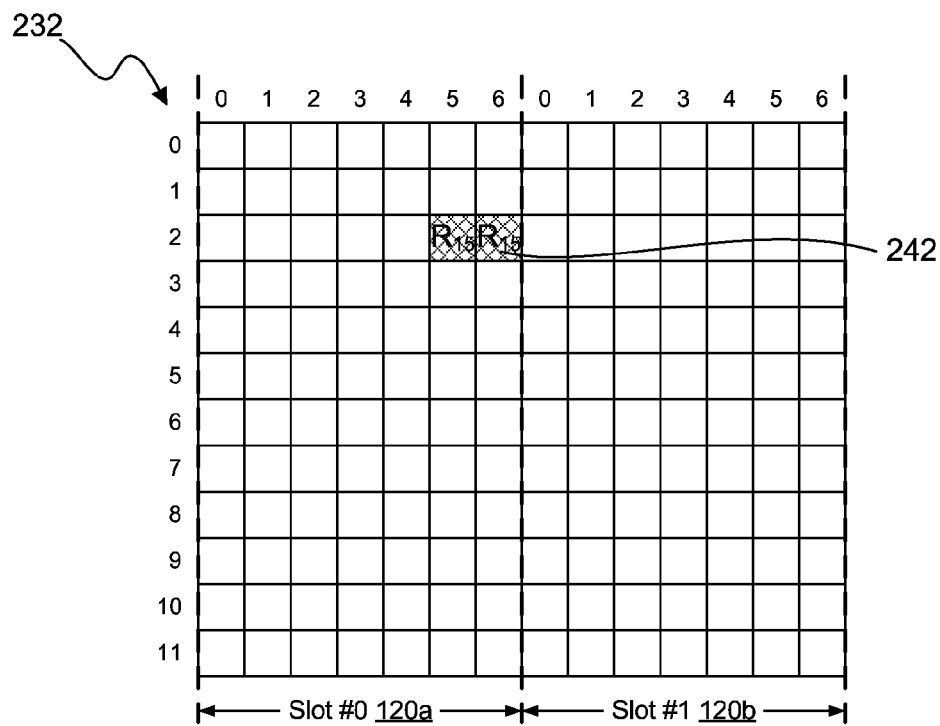
FIG. 3A illustrates a block diagram of channel state information reference signals (CSI-RS) in a resource block (RB) for antenna port 15 (or antenna port 16) in a CSI configuration 0 in a one, two, four, or eight antenna port wireless transceiver in accordance with an example.
Figure 3B:
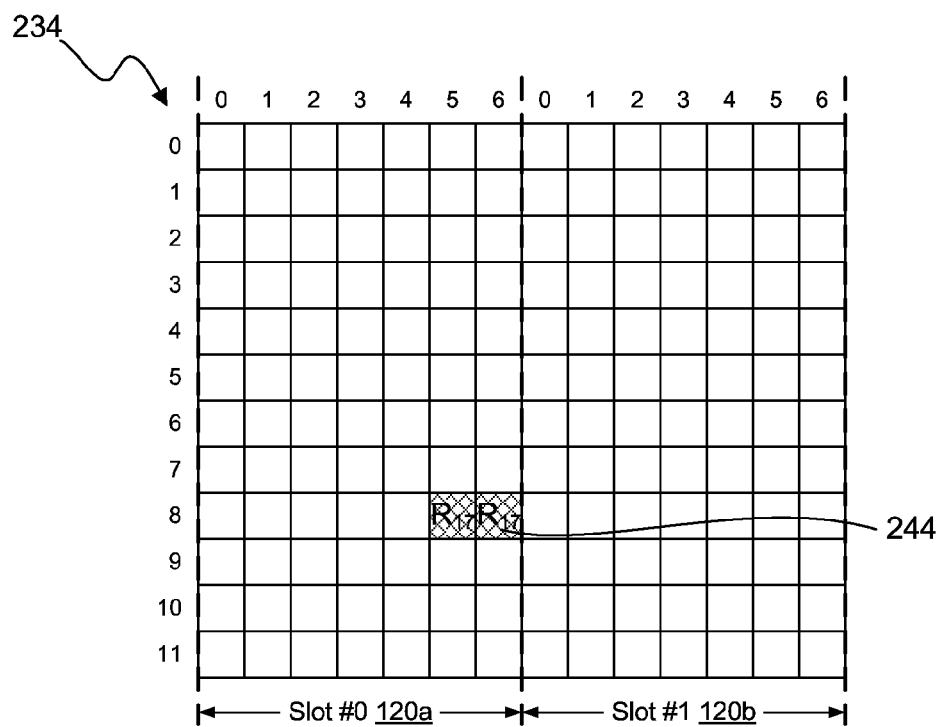
FIG. 3B illustrates a block diagram of channel state information reference signals (CSI-RS) in a resource block (RB) for antenna port 17 (or antenna port 18) in a CSI configuration 0 in a four or eight antenna port wireless transceiver in accordance with an example.
Figure 3C:
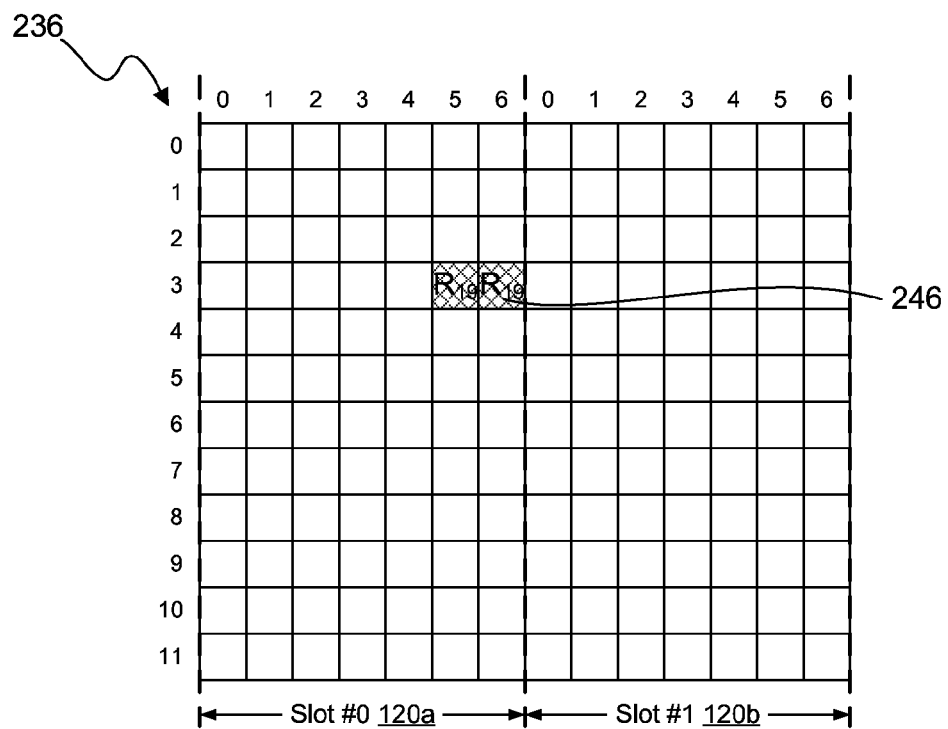
FIG. 3C illustrates a block diagram of channel state information reference signals (CSI-RS) in a resource block (RB) for antenna port 19 (or antenna port 20) in a CSI configuration 0 in an eight antenna port wireless transceiver in accordance with an example.
Figure 3D:
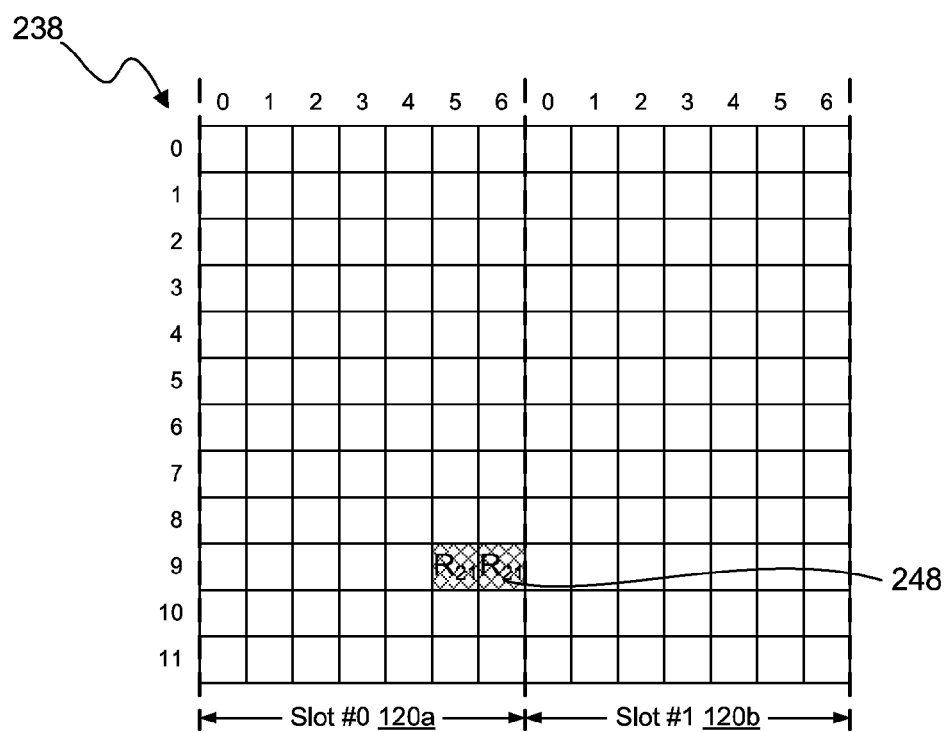
FIG. 3D illustrates a block diagram of channel state information reference signals (CSI-RS) in a resource block (RB) for antenna port 21 (or antenna port 22) in a CSI configuration 0 in an eight antenna port wireless transceiver in accordance with an example.

FIG. 3A illustrates a RB 232 with CSI-RS for antenna port 15 in a two, four, or eight antenna port wireless transceiver. As illustrated in FIG. 3A, the RB may include two (2) CSI-RS REs (CSI-RS OFDM symbols) 242 in a normal downlink subframe (CSI-RS configuration 0) used for transmitting UE-RSs for a specific antenna port (e.g., antenna port 15). The CST-RS REs for antenna port 16 (not shown) can be located in the REs with the same frequency-domain index and time-domain index as the CSI-RS REs for antenna port 15. FIG. 3B illustrates the CSI-RS REs 244 in an RB 234 used for transmitting CSI-RSs for antenna port 17. The CSI-RS REs for antenna port 18 (not shown) can be located in the REs with the same frequency-domain index and time-domain index as the CSI-RS REs for antenna port 17. Ha 3C illustrates the CSI-RS REs 246 in an RB 236 used for transmitting CSI-RSs for antenna port 19. The CSI-RS REs for antenna port 20 (not shown) can be located in the REs with the same frequency-domain index and time-domain index as the CSI-RS REs for antenna port 19. FIG. 3D illustrates the CSI-RS REs 248 in an RB 238 used for transmitting CSI-RSs for antenna port 21. The CSI-RS REs for antenna port 22 (not shown) can be located in the REs with the same frequency-domain index and time-domain index as the CSI-RS REs for antenna port 21. Data in the PDSCH can occupy the remaining REs. Antenna ports 15 and 16 can be used in a two, four, or eight antenna port wireless transceiver. Antenna ports 17 and 18 can be used in a four or eight antenna port wireless transceiver. Antenna ports 19-22 can be used in an eight antenna port wireless transceiver. Other CSI configurations of the CSI-RS (not shown) may also be used.

In LTE systems, the channel-state information reference signal (CSI-RS) can be transmitted on antenna ports 15 to 22 and can be used for cell search and initial acquisition, downlink channel estimation for coherent demodulation/detection at the UE, and/o downlink channel quality measurements for link adaption. The CST-RS can be found in the REs of the last two columns of the time-domain index of the even number slot of the RB. Cell specific antenna ports and the UE specific antenna port may not be simultaneously used (usage may be time-multiplexed). CSI reference signals can be relatively sparse in frequency but regularly transmitted from all antennas at the base station, while the UE-specific reference signals can be denser in frequency but may be only transmitted when data is transmitted on a corresponding transmission layer, where a transmission layer can correspond to a transmission antenna.

Both UE-RSs and CSI-RSs can be used in an open-loop multiple-input multiple-output (MIMO) mobile communication system. The UE-RSs and CSI-RSs may be mapped in a PRB with data in a PDSCH by resource element mapper. The data in a PDSCH or the UE-RSs can be precoded for large delay cyclic delay diversity (CDD).

Figure 4A:
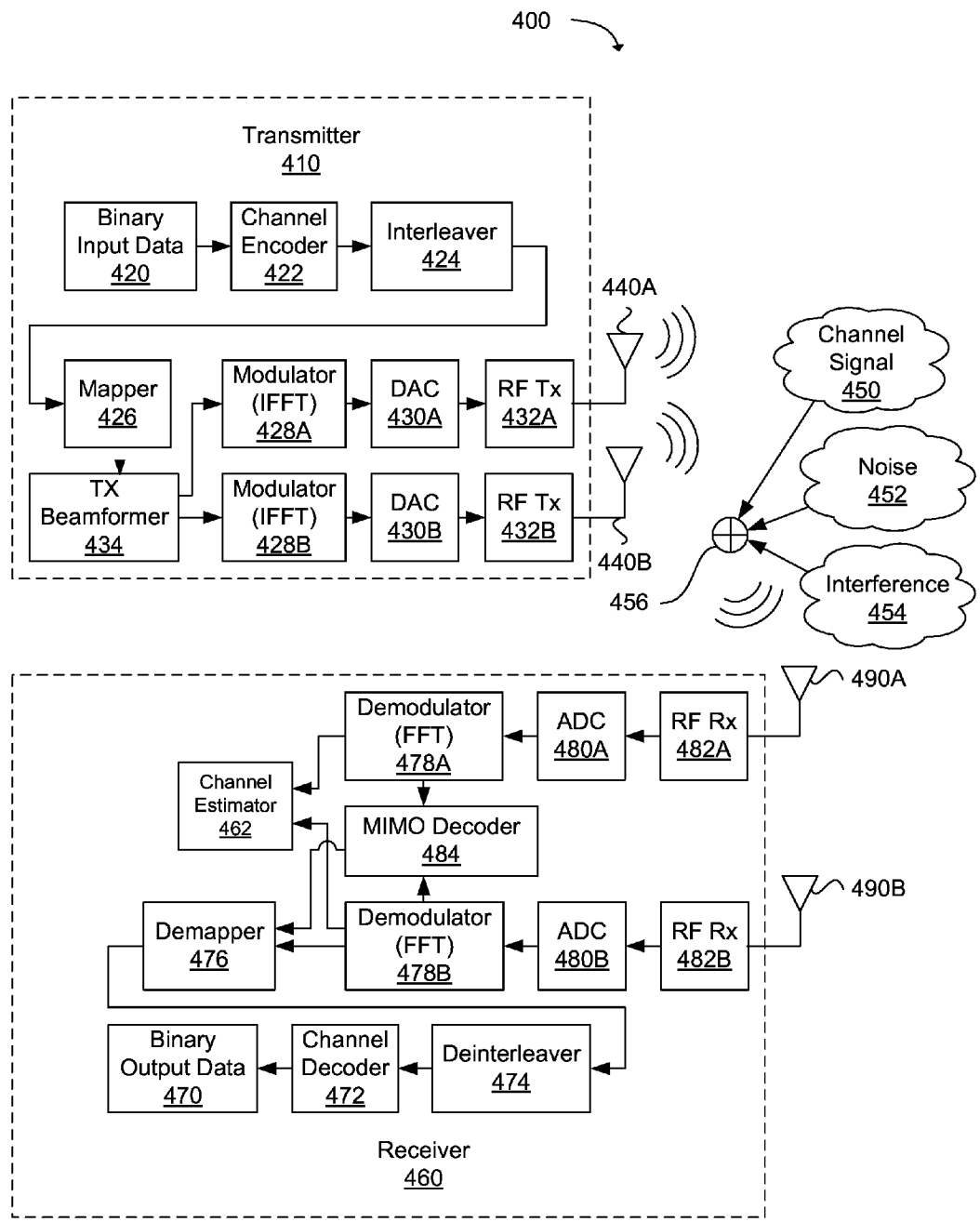
FIG. 4A illustrates a block diagram of the physical layer of a transmitter and receiver in an orthogonal frequency-division multiplexing (OFDM) wireless network in accordance with an example.

A wireless communication system can be subdivided into various sections referred to as layers. In the LTE system, communication layers can include the physical (PHY), media access control (MAC), radio link control (RLC), packet data convergence protocol (PDCP), and radio resource control (RRC) layers. The physical layer can include the basic hardware transmission components of a wireless communication system 400, as illustrated in FIG. 4A. A basic multiple-input multiple-output (MIMO) system is used for simplicity in illustrating the basic hardware transmission components, but the components can also be adapted for a complex MIMO system, a SISO system, or similar system. For example in a MIMO system, at the transmitter 410, binary input data 420 can be protected through encoding using a channel encoder 422, interleaved against fading phenomenon using an interleaver 424, and mapped to improve reliability using a mapper 426. The mapped data can be separated into layers for antenna ports by a transmitter (TX) beamformer 434 and the layers can be OFDM modulated into OFDM symbols using modulators 428A-B. The modulators can use an inverse fast Fourier transform (IFFT) algorithm to compute the inverse discrete Fourier transform (IDFT) to generate modulated signals (vector x for each antenna port). The modulated signals can be converted to analog signals with digital-to-analog converters (DACs) 430A-B. The analog signals can be transmitted via radio frequency (RF) transmitters (Txs) 432A-B configured to send the signal to transmitter antennas 440A-B operable to communicate the signal. The analog signals will follow a path referred to as a channel. The analog signals travelling through that path can be referred to as a channel signal 450. The physical layer can include other components (not shown), such as series-to-parallel (S/P) converters, parallel-to-serial (P/S) converters, cyclic prefix (CP) inserters and deleters, guard band inserters and deleters, and other desired components.

The transmitted channel signal 450 can be subject to noise 452 and interference 454. The noise and interference is represented as an addition 456 to the channel signal, which can be received by receiver antennas 490A-B and one or more radio frequency (RF) receivers (Rxs) 482A-B at the receiver 460. The channel signal combined with the noise and interference can be converted to a digital modulated signal with analog-to-digital converters (ADCs) 480A-B. The digital signal can be OFDM demodulated using demodulators 478A-B. The demodulators can use a fast Fourier transform (FFT) algorithm to compute the discrete Fourier transform (DFT) to generate demodulated signals (vector y for each antenna port). A channel estimator 462 can use the demodulated signal to estimate the channel 450 and the noise and interference that occurs in the channel. The channel estimator can include a feedback generator or be in communication with the feedback generator, which can generate a physical uplink shared channel (PUSCH) feedback report, such as a channel quality indicator (CQI) report, a preceding matrix indicator (PMI) report, or a transmission rank indicator (RI) report. The CQI can be used to assist the MIMO transmissions modes. The demodulated signals can be combined using a MIMO decoder 484, demapped using a demapper 476, deinterleaved using a deinterleaver 474, and decoded by a channel decoder 472 to generate binary output data 470 that can be used by other layers of the receiving station.

Figure 4B:
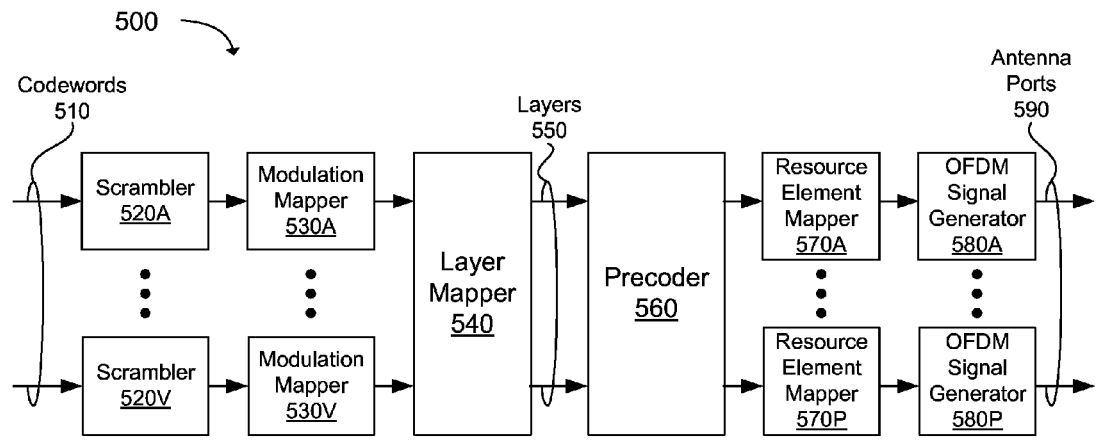
FIG. 4B illustrates a block diagram of physical channel processing of a physical channel processor in accordance with an example.

FIG. 4B illustrates additional details related to the interleaver 424, the mapper 426, the transmitter beamformer 434, and the modulators 428A-B of the physical channel processor shown in FIG. 4A for an LTE MIMO mobile communication system. Corresponding features can also exist on the receiver 460. The MIMO physical channel processor 500 of FIG. 4B can include scramblers 520A-V, modulation mappers 530A-V, a layer mapper 540, a precoder 560, resource element mappers 570A-P, and OFDM signal generators 580A-P. The scramblers can scramble each of the codewords 510 into coded bits to be transmitted on a physical channel. Modulation mappers can modulate scrambled bits to generate complex-valued modulation symbols. A layer mapper can map the modulation symbols onto a plurality of transmission layers 550. The precoder can precode the modulation symbols on each layer for transmission on antenna ports 590. The resource element mappers can map the modulation symbols for each antenna port to resource elements (REs). The OFDM signal generator can generate a complex-valued time-domain OFDM signal for each antenna port.

The data in a PDSCH or the UE-RSs can be precoded for large delay cyclic delay diversity (LD-CDD) by the precoder 560. CDD is a diversity scheme used in OMNI-based telecommunication systems where spatial diversity can be transformed into frequency diversity and thereby avoids intersymbol interference. CDD can be used in a MIMO system with N transmit antennas.

Figure 5:
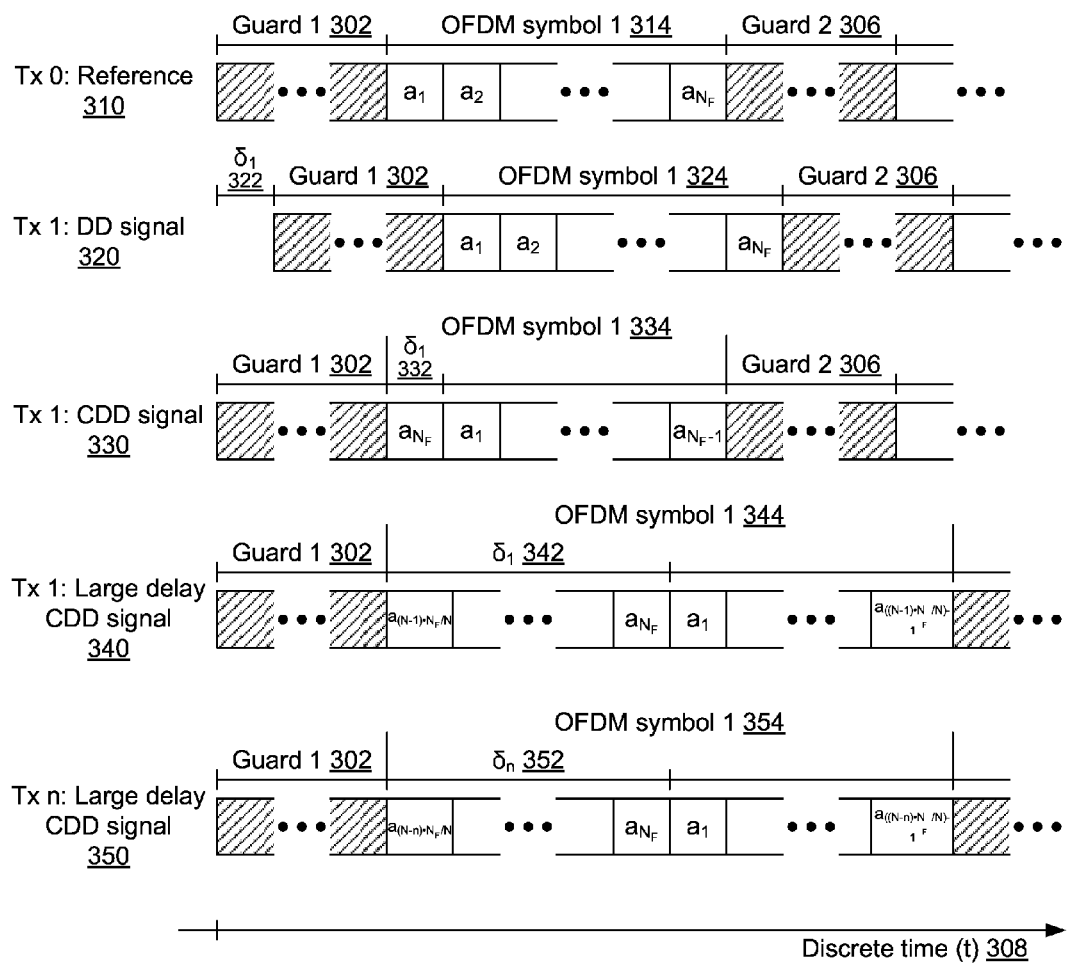
FIG. 5 illustrates a block diagram of delay diversity (DD), cyclic delay diversity (CDD), and large-delay CDD in the time-domain in accordance with an example.

Referring to FIG. 4A, an OFDM modulation can be performed, which can includes forward error correction (FEC), interleaving, modulation, and an inverse fast Fourier transformation (IFFT). The signal can be split in N antenna branches by a transmitter beamformer 434, where N represents the number of antennas. The cyclic shift of the first antenna (Tx 0) may be set to zero (a reference signal 310), while in the other branches the signal may be cyclically shifted by an antenna specific cyclic shift $\delta_n$, where n is an integer representing the transmit antenna (or receive antenna) and n=0, 1, . . . , N−1, as illustrated in FIG. 5.

An equivalent representation of the delay in the frequency domain, which can be called phase diversity (PD) (not shown), can directly be calculated from the IFFT size (or length) $N_F$. $N_F$ can be the IFFT size of the modulator (on the transmitter) or the FFT size of the demodulator (on the receiver). $N_F$ can be the number of sub-channels or subcarriers. FIG. 5 illustrates the difference between delay diversity (DD) 320 and cyclic delay diversity (CDD) 330 in the time domain. The reference signal 310 on the antenna Tx 0 is undelayed, while the signal on the antenna Tx 1 is delayed by one sample 322 for DD and cyclically shifted by one sample 332 for CDD. FIG. 5 illustrates an example of an OFDM symbol 314 in a reference signal 310 for a first antenna (Tx 0), an OFDM symbol 324 in a DD signal 320 for a second antenna (Tx 1), an OFDM symbol 334 in a CDD signal 330 for the second antenna (Tx 1), an OFDM symbol 344 in a long delay CDD signal 340 for the second antenna (Tx 1), and an OFDM symbol 354 in a long delay CDD signal 350 for an n antenna (Tx n) in the discrete time 308 domain.

In DD, the non-delayed signal can be transmitted over a first antenna 310, while a delayed version of the signal may be transmitted aver a second antenna 320 or each additional antenna. In OFDM, DD can be used to increase the frequency diversity. A forward error correction (FEC) code can pick up the increased frequency diversity and thus lower the bit error rate (BER) and the frame error rate (FER). DD can cause inter-symbol interference if the delay is too large, which maximum delay may be determined by the length of a guard interval (GI) 302 and 306.

In contrast, CDD allows for increased frequency diversity and a lower BER without limitations by the guard interval 302 and 306 where the signal on the second antenna or each additional antenna is not delayed 322 but cyclically shifted 332. Hence, no inter-symbol interference may occur and thus the cyclic shift may not be limited. CDD may not add additional complexity in the receiver (less complexity relative to DD) and no rate loss may occur in contrast to other space-time codes, even for a large number of antennas, such as eight antennas.

After the cyclic shift in CDD, the prefix of the shifted signal can be added to fill the guard interval. The signals of the different transmit antennas superimpose on the channel and the receiver processes the sum signal by simply removing the guard interval and by performing the inverse OFDM (IOFDM), which contains the Fast Fourier Transformation (FFT), the demodulation, the deinterleaving, and the decoding. Receiver processing is possible, since the cyclic shifts can appear as multi-paths at the receiver and thus, no special combining and no additional effort may be necessary because only the characteristics of the channel seen by the receiver may have changed.

In a MIMO OFDM system, a transmitter can have M transmit antennas and a receiver can have N receive antennas, a transmit antenna can be m=0, 1, . . . M−1 and a receive antenna can be n=0, 1, . . . N−1. For illustration, the large delay will be defined for N receive antennas, but the large delay can also be applied to the transmit antennas. In an example, the large delay can be defined as $\delta_n = n * N_F / N$ (in samples). FIG. 5 illustrates the large delay $\delta_1$ 342 for a Tx 1 and the large delay $\delta_n$ 342 for a Tx n. For example, the large delay for a Tx 3 can be $\delta_n = 192$ (in samples) (3*512/64) when the receive antennas is N=8 and the number of subchannels is $N_F = 512$. CDD has been extended to spatial multiplexing. However, CDD precoding may not be interpreted as a pure cyclic delay in the time domain, but rather CDD precoding can be implemented by phase shifts in the frequency domain (i.e., frequency domain precoding) (not shown).

For low mobility scenarios in LTE, closed loop MIMO schemes can be used where a precoder is chosen from a code book based on the feedback from the user equipment (UE) to the eNodeB. Feedback for closed loop MIMO can include PMI/RI reporting. For scenarios with higher mobility in LTE, open loop (OL) MIMO may be used where the precoding can provide an increased level of diversity. The increased level of diversity can be achieved by cyclic delay diversity (CDD) based precoding. In CDD based precoding, the feedback from the UE to the eNodeB can contain the rank (number of spatial streams) supported by the channel as well as a channel quality indicator (CQI) for adaptation of code rate and modulation scheme, but no short-term feedback for the choice of the spatial precoder may be provided to the eNodeB.

In LTE, a transmission mode (e.g., transmission mode 10) can provide for open loop MIMO using CSI-RS and UE-RS, instead of CRS, as illustrated by the table in FIG. 6. The transmission mode may be used by an eNodeB to configure a UE for large delay CDD decoding of a PDSCH using a cell radio network temporary identifier (C-RNTI). The eNodeB can assign a radio network temporary identifier (RNTI) to the UE in a cell for precutting and decoding the PDCCH and PDSCH. Transmission mode 10 can be configured for large delay CDD transmitted on up to eight antennas. A rank (or layers) can refer to the number of antennas used for transmission (or reception). For example, a rank of four can refer to a MIMO transmission configured for four antennas. Using four layers (v) can refer to a MIMO transmission configured for four antennas or four antenna ports. Transmission mode 10 can include a downlink control information (DCI) format (e.g., DCI format 2D), which can include at least three bits for precoding information, as illustrated by the table in FIG. 7. The bits for precoding information can allow for precoder cycling with large delay CDD for more than four layers, as illustrated by the table in FIG. 8. Open loop MIMO can be provided by aperiodic CSI reporting modes (modes 2-0 or 3-0) or periodic CSI reporting modes (modes 1-0 or 2-0) using PUSCH CQI feedback without PMI/RI feedback. Mode 1-0 can use a wideband CQI value per codeword, mode 2-0 can use a UE-selected subband CQI, and mode 3-0 can use a higher layer-configured subband CQI. For CSI reporting modes, transmission mode 10 may be similar to transmission mode 3. For transmission mode 10, PRB bundling may not be applied.

As shown in FIG. 4B, a physical channel processor can include a precoder 560. For open loop MIMO using CSI-RS and UE-RS, a precoder can be configured for large delay CDD on an antenna port. The precoder can receive an input vector block from a layer mapper. The input vector block can include user equipment-specific reference signals (UE-RSs) or data for a physical downlink shared channel (PDSCH). The UE-RSs can be used for channel estimation. The precoder can generate a large delay cyclic delay diversity (CDD) vector block from the input vector block. When data is precoded, the data can be resource element mapped with UE-RSs or channel-state information reference signals (CSI-RSs) in a physical resource block (PRB). The precoder can be configured for large delay CDD transmitted on up to eight antennas. The large delay CDD vector block can have a rank greater than four, but a rank of 1, 2, and 3 may also be used.

For the UE-RS, the large delay CDD vector block can use a precoding matrix W. For example, the large delay CDD vector block for UE-RSs or data in the PDSCH can be represented by Equation 1, shown below, where $$\begin{bmatrix} x^{(0)}(i) \\ \vdots \\ x^{(v-1)}(i) \end{bmatrix}$$

is the input vector block, $$\begin{bmatrix} y^{(7)}(i) \\ \vdots \\ y^{(6+v)}(i) \end{bmatrix}$$

is the large delay cyclic delay diversity (CDD) vector block, $W(i)$ is a precoding matrix of size $P \times v$ where P is a number of antenna ports used for transmission of a channel and v is a number of transmission layers, and i=0, 1, . . . , $M_{symb}^{ap}-1$, $M_{symb}^{ap}=M_{symb}^{layer}$ is a number of modulation symbols to transmit per antenna port for a physical channel and $M_{symb}^{layer}$ is a number of modulation symbols to transmit per antenna port for a physical channel.

$$\begin{bmatrix} y^{(7)}(i) \\ \vdots \\ y^{(6+v)}(i) \end{bmatrix} = W(i) \begin{bmatrix} x^{(0)}(i) \\ \vdots \\ x^{(v-1)}(i) \end{bmatrix} \quad \text{[Equation 1]}$$

The precoding matrix W or W(i) can be defined in a codebook on a wireless device, such as a UE or eNodeB. The precoding matrix W(i) can be selected according to $W(i)=C_k$, where k is the precoder index given by $k=(i_{RB}^{PDSCH} \mod 4)+1 \in \{1, 2, 3, 4\}$, where $i_{RB}^{PDSCH}=f(i) \in 0, 1, \ldots, N_{RB}^{PDSCH}$, f(i) stands for the mapping relationship from i to the allocated PRB for the physical downlink shared channel. In an example, the eNodeB can cyclically assign different precoders for the UE on the PDSCH. For four antenna ports, $C_1$, $C_2$, $C_3$, and $C_4$ denote precoding matrices corresponding to precoder indices 12, 13, 14, and 15, respectively in the table illustrated in FIG. 9A. For eight antenna ports and two layers, $C_1$, $C_2$, $C_3$, and $C_4$ denote precoding matrices corresponding to precoder indices $i_1$=0, 4, 8, 12; $i_2$=0 respectively, in the table illustrated in FIG. 9B. For eight antenna ports and three to seven layers, $C_1$, $C_2$, $C_3$, and $C_4$ denote precoding matrices corresponding to precoder indices $i_1$=0, 1, 2, 3; $i_2$=0 respectively, in the tables illustrated in FIG. 9C-9G. For eight antenna ports and eight layers, the precoding matrix $W(i)=C_1$ where $C_1$ denotes the precoding matrix in the table illustrated in FIG. 9H. Alternatively, for eight antenna ports and two layers, the precoder index has other equivalent candidates such as $i_1$=2, 6, 10, 14 and $i_2$=0. Furthermore, the rotation of the precoder index on different RBs can be based on PRB indexes such as $k=(i_{RB}^{PDSCH} \mod 8)+1 \in \{1, 2, \ldots, 8\}$, where $C_1, C_2, \ldots, C_8$ denote precoding matrices corresponding to precoder indices $i_1$=0, 4, 8, 12, 2, 6, 10, 14; $i_2$=0. The precoding matrix can be configured to change from PRB PRB, instead of from subcarrier to subcarrier. A different precoder can be used every PRB.

For data in the PDSCH, the large delay CDD vector block can include a matrix product of a precoding matrix a diagonal large delay CDD matrix D, and a rotation matrix U. For example, the large delay CDD vector block for data in the PDSCH can be represented by Equation 2, shown below, where $$\begin{bmatrix} x^{(0)}(i) \\ \vdots \\ x^{(v-1)}(i) \end{bmatrix}$$

is the input vector block, $$\begin{bmatrix} y^{(0)}(i) \\ \vdots \\ y^{(P-1)}(i) \end{bmatrix}$$

is the large delay cyclic delay diversity (CDD) vector block, D(i) is a diagonal large delay cyclic delay diversity (CDD) matrix of size $v \times v$, U is a rotation matrix of size $v \times v$, W(i) is a precoding matrix of size $P \times v$ where P is a number of antenna ports used for transmission of a channel and v is a number of transmission layers, and i=0, 1, . . . , $M_{symb}^{ap}-1$, $M_{symb}^{ap}=M_{symb}^{layer}$ where $M_{symb}^{ap}$ is a number of modulation symbols to transmit per antenna port for a physical channel and $M_{symb}^{layer}$ is a number of modulation symbols to transmit per antenna port for a physical channel.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \qquad \text{[Equation 2]}$$

The diagonal large delay CDD matrix D or D(i) and the rotation matrix U can be predefined based on a number of layers v, as illustrated by the table in FIG. 10. For transmission mode 10, the large delay CDD vector block for data in the PDSCH may not be the same as the large delay CDD vector block for UE-RS.

The large delay CDD vector block can be transmitted to a resource element mapper (570A-P in FIG. 4B). The large delay CDD vector block can be mapped into a PRB by the resource element mapper. Data in the PDSCH can be mapped with UE-RSs CSI-RSs.

In another example, random beamforming plus a large delay CDD can be used in a single user open loop MIMO (SU-MIMO) transmission. Open loop SU-MIMO can be easier to deploy and can have better performance than closed loop SU-MIMO for medium to high mobility, where reliable CSI feedback may not be available. Using UE-RSs instead of CRSs, transmission mode 3 (FIG. 6) can be extended to feedback at least two CQIs for a rank greater than one.

Random beamforming can be a simple way of achieving good performance that scales like a sum capacity when the number of receivers is large. In random beamforming, a set of beamforming weights can be selected randomly and UEs can feed back a few bits to tell the transmitter which beam gives the best performance and what rate the UEs can support the beam transmission. When the number of users is large, each random beamforming weight can provide good performance for some user.

In random beamforming, random orthonormal beams are constructed and transmitted to users with the highest signal-to-noise-plus-interference ratios (SINRs). Orthonormal beams can have an isotropic distribution. To have full channel knowledge at the receiver without random beamforming, each UE can feed back complex numbers, such as the receiver's channel gains, to the transmitter. With random beamforming each UE can feed back one real number, such as the channel with the best SINR given by a corresponding index which can be an integer number. UEs having favorable SINRs can provide a single number, such as a CQI, which can considerably reduce the amount of feedback used in transmission.

The precoder can be configured for large delay CDD for UE-RSs or data in the PDSCH using a precoding matrix with precoding matrix W or represented by Equation 1, shown above. The precoding matrix Wean be a random beam forming matrix. The preceding matrix W or W(i) can be defined in a codebook on a wireless device, such as a UE or eNodeB. The precoding matrix W(i) can be selected according to W(i)= $C_k$, where k is the precoder index given by k=($i_{RB}^{PDSCH}$ mod 4)+1∈{1, 2, 3, 4}, where $i_{RB}^{PDSCH}$=f(i)∈0, 1, . . . , $N_{RB}^{PDSCH}$, f(i) stands for the mapping relationship from i to the allocated PRB for the physical downlink shared channel.

In an example, the eNodeB can cyclically assign different precoders for the UE on the PDSCH. For two antenna ports, the precoding matrix W(i)=$C_1$ where $C_1$ denotes the precoding matrix corresponding to precoder index 0 in the table illustrated in FIG. 9I. For four antenna ports, $C_1, C_2, C_3, C_4$ denote precoding matrices corresponding to precoder indices 12, 13, 14, and 15, respectively, in the table illustrated in FIG. 9A. For eight antenna ports and two layers, $C_1, C_2, C_3, C_4$ denote precoding matrices corresponding to precoder indices $i_1$=0, 4, 8, 12; $i_2$=0 respectively, in the table illustrated in FIG. 9B. For eight antenna ports and three to seven layers, $C_1, C_2$, $C_3, C_4$ denote precoding matrices corresponding to precoder indices $i_1$=0, 1, 2, 3; $i_2$=0 respectively, in the tables illustrated in FIG. 9C-9G For eight antenna ports and eight layers, the precoding matrix W(i)=$C_1$ where $C_1$ denotes the precoder mat the table illustrated in FIG. 9H. Alternatively, for eight antenna ports and two layers, the precoder index it has other equivalent candidates such as $i_1$=2, 6, 10, 14 and $i_2$=0. Furthermore, the rotation of the precoder index on different RBs can be based on PRB indexes such as k=($i_{RB}^{PDSCH}$ mod 8)+1∈{1, 2, . . . , 8}, where $C_1, C_2, \ldots, C_8$ where denote precoding matrices corresponding to precoder indices $i_1$=0, 4, 8, 12, 2, 6, 10, 14; $i_2$=0. The precoding matrix can be configured to change from PRB to PRB, instead of from subcarrier to subcarrier. A different precoder can be used every PRB. Aperiodic CSI reporting modes (modes 2-0 or 3-0) or periodic CSI reporting modes (modes 1-0 or 2-0) can be used for random beamforming plus a large delay CDD in an open loop MIMO transmission.

Figure 11:
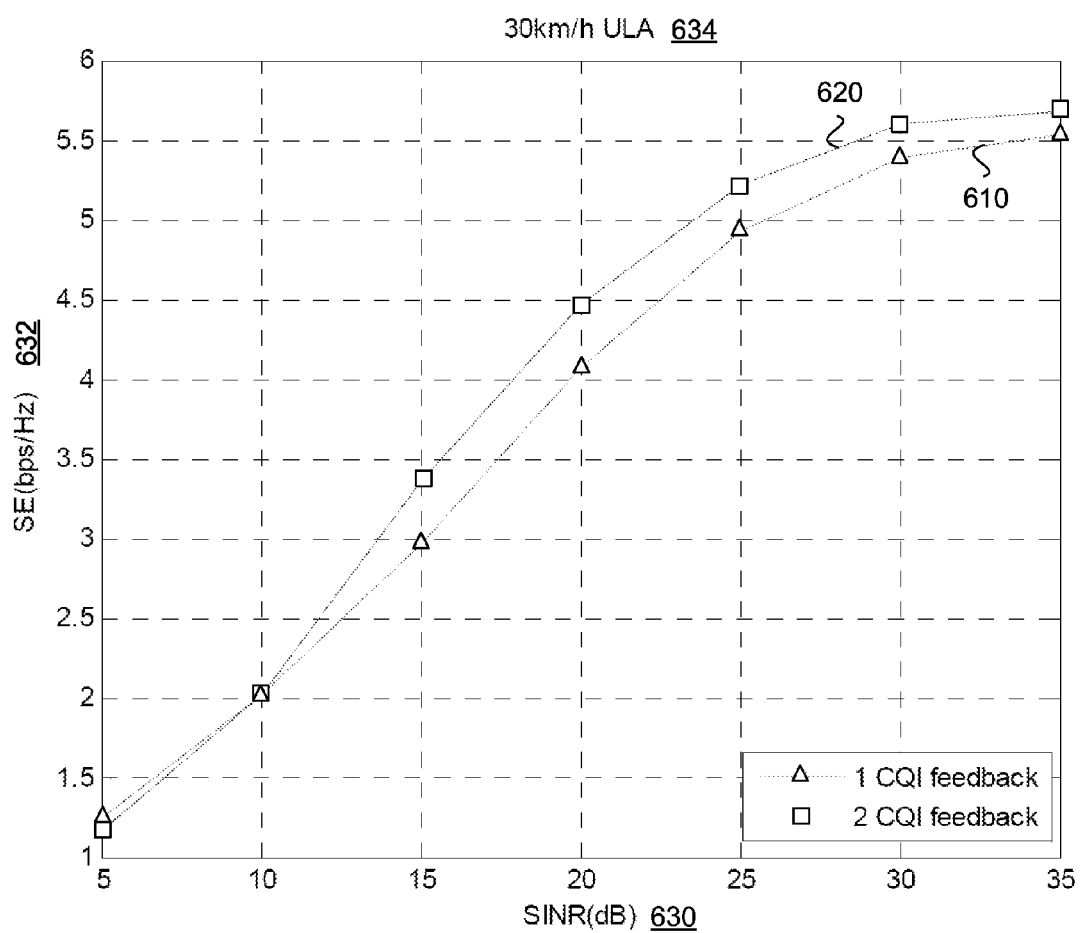
FIG. 11 illustrates a spectrum efficiency (SE) performance comparison graph with one channel quality indicator (CQI) feedback and two CQI feedback relative to signal-to-noise-and-interference ratios (SINRs) in accordance with an example.

A precoder configured for random beamforming plus a large delay CDD using the UE-RS can report at least two CQIs for the two transport blocks (TBs) in a PUSCH feedback providing CQI accuracy without the rotation matrix U. FIG. 11 illustrates the performance comparison with one CQI feedback 610 and two CQI feedback 620, where the horizontal axis represents SINR 630 (measured in decibels) for transmission to a uniform linear array (ULA) 634 at a velocity of 30 km/h relative to the eNB, and the vertical axis represents spectral efficiency (SE) 632 (measured in bps/Hz). A decibel (dB) is a logarithmic unit that indicates the ratio of a physical quantity (usually power or intensity) relative to a specified or implied reference level. A ratio in decibels is ten times the logarithm to base 10 of the ratio of two power quantities. A signal-to-noise-and-interference ratio (SINE) or signal-to-interference ratio (S/I or SIR), also known as the carrier-to-interference ratio (C/I, CIR), refers to the quotient between the average received modulated carrier power S or C and the average received co-channel interference power 1, i.e. crosstalk, from other transmitters than the useful signal. Spectral efficiency (SE) spectrum efficiency or bandwidth efficiency refers to the information rate that can be transmitted over a given bandwidth in a specific communication system. SE can be a measure of how efficiently a limited frequency spectrum is utilized by the physical layer protocol, and sometimes by the media access control (the channel access protocol).

Figure 12:
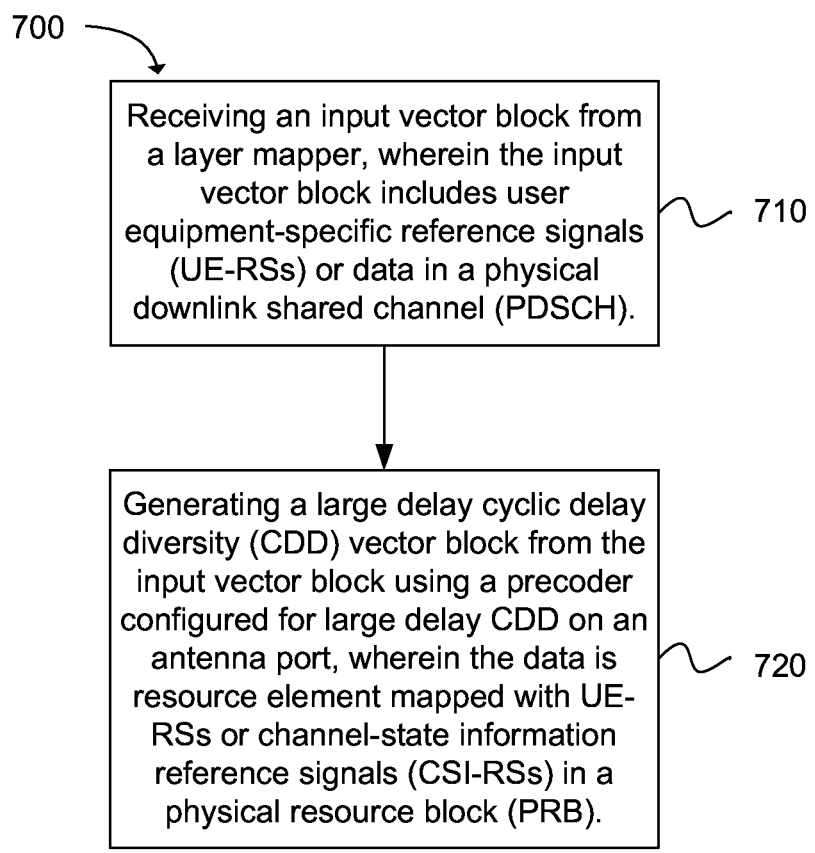
FIG. 12 depicts a flow chart of a method for precoding for spatial multiplexing in an open-loop multiple-input and multiple-output (MIMO) mobile communication system in accordance with an example.

Another example provides a method 700 for precoding for spatial multiplexing in an open-loop multiple-input multiple-output (MIMO) mobile communication system, as shown in the flow chart in FIG. 12. The method includes the operation of receiving an input vector block from a layer mapper, wherein the input vector block includes user equipment-specific reference signals (UE-RSs) or data in a physical downlink shared channel (PDSCH), as in block 710. The operation of generating a large delay cyclic delay diversity (CDD) vector block from the input vector block using a precoder configured for large delay CDD on an antenna port, wherein the data is resource element mapped with UE-RSs or channel-state information reference signals (CSI-RSs) in a physical resource block (PRB) follows, as in block 720.

Figure 13:
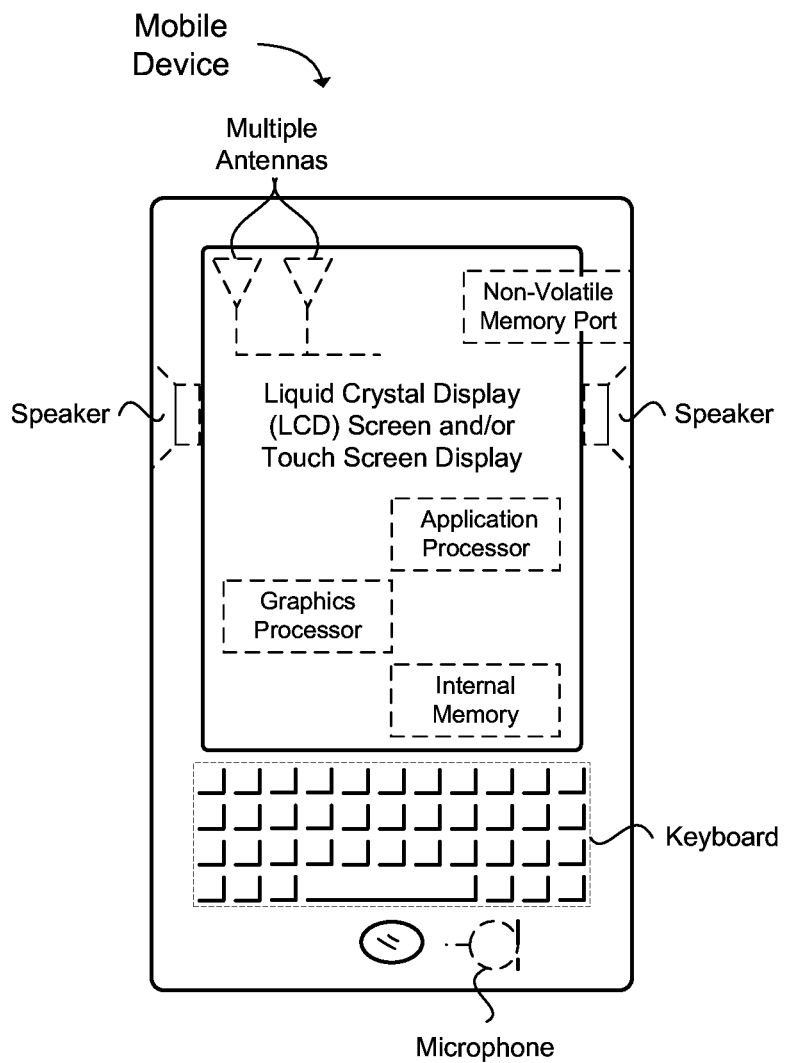
FIG. 13 illustrates a diagram of a mobile device in accordance with an example.

In another example, the physical channel processor can be included in a mobile device or a transmission station. FIG. 13 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with transmission station, such as a base station (BS), an evolved Node B (eNB), or other type of wireless wide area network (WWAN) access point. The mobile device can be configured to communicate using at least one wireless communication standard including 3GPP LTE, WiMAX, High Speed Packet Access (HSPA), Bluetooth, and WiFi (IEEE 802.11 standard). The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 13 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for precoding for spatial multiplexing in an open-loop multiple-input multiple-output (MIMO) mobile communication system, comprising:
receiving an input vector block from a layer mapper, wherein the input vector block includes user equipment-specific reference signals (UE-RSs) or data in a physical downlink shared channel (PDSCH); and
generating a large delay cyclic delay diversity (CDD) vector block from the input vector block using a precoder configured for large delay CDD on an antenna port, wherein the data is resource element mapped with UE-RSs or channel-state information reference signals (CSI-RSs) in a physical resource block (PRB).

2. The method of claim 1, wherein the large delay CDD vector block has a rank greater than four.

3. The method of claim 1, wherein the precoder includes a precoding matrix predefined in a codebook on a wireless device.

4. The method of claim 1, wherein the precoder for the UE-RS or data in the PDSCH uses a precoding matrix W.

5. The method of claim 4, wherein the precoding matrix W is a random beam forming matrix.

6. The method of claim 1, wherein the precoder for data in the PDSCH uses a matrix product of a precoding matrix W, a diagonal large delay CDD matrix D, and a rotation matrix U.

7. The method of claim 6, wherein the diagonal large delay CDD matrix D and the rotation matrix U are predefined based on a number of layers.

8. The method of claim 1, wherein the precoder includes a precoding matrix configured to change from PRB to PRB.

9. The method of claim 1, further comprising:
transmitting the large delay CDD vector block to a resource element mapper; and
mapping the large delay CDD vector block by the resource element mapper in a PRB, wherein the data in the PDSCH is mapped with UE-RSs or CSI-RSs when the large delay CDD vector block includes data in the PDSCH.

10. The method of claim 1, wherein the precoding for UE-RSs or data in the PDSCH is defined by $$\begin{bmatrix} y^{(7)}(i) \\ \vdots \\ y^{(6+v)}(i) \end{bmatrix} = W(i) \begin{bmatrix} x^{(0)}(i) \\ \vdots \\ x^{(v-1)}(i) \end{bmatrix} \text{ where } \begin{bmatrix} x^{(0)}(i) \\ \vdots \\ x^{(v-1)}(i) \end{bmatrix}$$

is the input vector block, $$\begin{bmatrix} y^{(7)}(i) \\ \vdots \\ y^{(6+v)}(i) \end{bmatrix}$$

is the large delay cyclic delay diversity (CDD) vector block, $W(i)$ is a precoding matrix of size P×v where P is a number of antenna ports used for transmission of a channel and v is a number of transmission layers, and $i=0, 1, \ldots, M_{symb}^{ap}-1$, $M_{symb}^{ap}=M_{symb}^{layer}$ where $M_{symb}^{ap}$ is a number of modulation symbols to transmit per antenna port for a physical channel and $M_{symb}^{layer}$ is a number of modulation symbols to transmit per antenna port for a physical channel.

11. The method of claim 1, wherein the precoding for spatial multiplexing using antenna ports for data in the PDSCH is defined by $$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix}$$

where $$\begin{bmatrix} x^{(0)}(i) \\ \vdots \\ x^{(v-1)}(i) \end{bmatrix}$$

is the input vector block, $$\begin{bmatrix} y^{(0)}(i) \\ \vdots \\ y^{(P-1)}(i) \end{bmatrix}$$

is the large delay cyclic delay diversity (CDD) vector block, $D(i)$ is a diagonal large delay cyclic delay diversity (CDD) matrix of size v×v, U is a rotation matrix of size v×v, $W(i)$ is a precoding matrix of size P×v where P is a number of antenna ports used for transmission of a channel and v is a number of transmission layers, and $i=0, 1, \ldots, M_{symb}^{ap}-1$, $M_{symb}^{ap}=M_{symb}^{layer}$ where $M_{symb}^{ap}$ is a number of modulation symbols to transmit per antenna port for a physical channel and $M_{symb}^{layer}$ is a number of modulation symbols to transmit per antenna port for a physical channel.

12. The method of claim 1, further comprising transmitting a transmission mode using a cell radio network temporary identifier (C-RNTI) to configure a user equipment (UE) for large delay CDD decoding of the PDSCH.

13. The method of claim 1, further comprising receiving a physical uplink shared channel (PUSCH) feedback including a channel quality indicator (CQI) or a transmission rank indicator (RI) without a precoding matrix indicator (PMI).

14. The method of claim 13, wherein receiving the PUSCH feedback includes at least two CQIs generated from at least two transport blocks.

15. A physical channel processor on a wireless device, comprising:
a precoder configured for large delay CDD on an antenna port, wherein the precoder generates a large delay cyclic delay diversity (CDD) vector block from an input vector block, the input vector block includes user equipment-specific reference signals (UE-RSs) or data in a physical downlink shared channel (PDSCH), and the the data is resource element mapped with UE-RSs or channel-state information reference signals (CSI-RSs) in a physical resource block (PRB).

16. The physical channel processor of claim 15, further comprising a layer mapper for generating input vector block.

17. The physical channel processor of claim 15, further comprising a resource element mapper for mapping the large delay CDD vector block in a PRB, wherein the data in the PDSCH is mapped with UE-RSs or CSI-RSs when the large delay CDD vector block includes data in the PDSCH.

18. The physical channel processor of claim 15, wherein the precoder is configured for large delay CDD transmitted on up to eight antennas.

19. The physical channel processor of claim 15, wherein the large delay CDD vector block has a rank greater than four.

20. The physical channel processor of claim 15, wherein the precoder includes a precoding matrix predefined in a codebook on the wireless device.

21. The physical channel processor of claim 15, further comprising a transceiver for transmitting a transmission mode using a cell radio network temporary identifier (C-RNTI) to configure a user equipment (UE) for large delay CDD decoding of the PDSCH.

22. The physical channel processor of claim 15, further comprising a transceiver for receiving a physical uplink shared channel (PUSCH) feedback including a channel quality indicator (CQI) or a transmission rank indicator (RI) without a precoding matrix indicator (PMI).

23. The physical channel processor of claim 15, wherein the physical channel processor is included in a wireless device configured to connect to at least one of a wireless local area network (WLAN), a wireless personal area network (WPAN), and a wireless wide area network (WWAN), wherein the wireless device includes an antenna, a touch sensitive display screen, a speaker, a microphone, a graphics processor, an application processor, internal memory, a non-volatile memory port, or combinations thereof.

24. A computer program product, comprising a non-transitory computer usable medium having a computer readable program code embodied therein, the computer readable program code adapted to be executed to implement a method for precoding for spatial multiplexing in an open-loop multiple-input and multiple-output (MIMO) mobile communication system comprising:
   receiving an input vector block from a layer mapper, wherein the input vector block includes user equipment-specific reference signals (UE-RSs) or data in a physical downlink shared channel (PDSCH); and
   generating a large delay cyclic delay diversity (CDD) vector block from the input vector block using a precoder configured for large delay CDD on an antenna port, wherein the data is resource element mapped with UE-RSs or channel-state information reference signals (CSI-RSs) in a physical resource block (PRB).

25. The computer program product of claim 24, wherein the large delay CDD vector block has a rank greater than four.

* * * * *